(12) United States Patent
Breyer et al.

(10) Patent No.: US 9,346,926 B2
(45) Date of Patent: May 24, 2016

(54) HIGH FLOW UREA-FORMALDEHYDE POWDERS FOR PARTICLEBOARD AND FIBERBOARD MANUFACTURE

(71) Applicant: Georgia-Pacific Chemicals LLC, Atlanta, GA (US)

(72) Inventors: Robert A. Breyer, Atlanta, GA (US); Tyler Krauth, Atlanta, GA (US); John D. Cothran, Conyers, GA (US); Paul S. Baxter, Conyers, GA (US); Ashlee Cribb, Roswell, GA (US)

(73) Assignee: Georgia-Pacific Chemicals LLC, Atlanta, GA (US)

(*) Notice: Subject to any disclaimer, the term of this patent is extended or adjusted under 35 U.S.C. 154(b) by 141 days.

(21) Appl. No.: 14/203,831

(22) Filed: Mar. 11, 2014

(65) Prior Publication Data

US 2014/0275354 A1    Sep. 18, 2014

Related U.S. Application Data

(60) Provisional application No. 61/782,949, filed on Mar. 14, 2013.

(51) Int. Cl.
| | | |
|---|---|---|
| *C08J 3/12* | (2006.01) | |
| *C08L 97/02* | (2006.01) | |
| *B27N 3/00* | (2006.01) | |
| *C08L 61/24* | (2006.01) | |

(52) U.S. Cl.
CPC . *C08J 3/122* (2013.01); *B27N 3/00* (2013.01); *C08L 61/24* (2013.01); *C08L 97/02* (2013.01)

(58) Field of Classification Search
CPC .................................. C08J 3/122; B27N 3/00
See application file for complete search history.

(56) References Cited

U.S. PATENT DOCUMENTS

| | | | |
|---|---|---|---|
| 6,080,804 A * | 6/2000 | Davies et al. | B01D 1/14 523/340 |
| 6,881,817 B2 | 4/2005 | Van Der Waals et al. | |
| 7,343,818 B2 | 3/2008 | Gysling et al. | |
| 7,596,987 B2 | 10/2009 | Gysling et al. | |
| 2011/0136947 A1 | 6/2011 | Knight et al. | |
| 2013/0085211 A1 * | 4/2013 | Baxter et al. | B27N 3/04 524/10 |

* cited by examiner

*Primary Examiner* — Ling Choi
*Assistant Examiner* — Lanee Reuther
(74) *Attorney, Agent, or Firm* — Ram W. Sabnis

(57) ABSTRACT

Particulate binder compositions made with amine-aldehyde resins and methods for making same are provided. The method for making the particulate binder composition can include spray-drying an amine-aldehyde resin having a total aldehyde compound to total amine compound molar ratio of about 1.55:1 to about 1.65:1 to produce a particulate binder composition. The particulate binder composition can have a fusion diameter of about 35 mm to about 70 mm.

20 Claims, No Drawings

HIGH FLOW UREA-FORMALDEHYDE POWDERS FOR PARTICLEBOARD AND FIBERBOARD MANUFACTURE

CROSS-REFERENCE TO RELATED APPLICATION

This application claims priority to U.S. Provisional Patent Application having Ser. No. 61/782,949, filed Mar. 14, 2013, which is incorporated by reference herein.

BACKGROUND

1. Field

Embodiments described generally relate to particulate binder compositions and methods for making and using the same. More particularly, such embodiments relate to particulate binder compositions including an amine-aldehyde resin for producing composite products.

2. Description of the Related Art

The production of various lignocellulose composite products, such as oriented strand board (OSB) and other similar wafer or chipboard products, utilizes powdered or particulate, curable aldehyde based resins (e.g., phenol-formaldehyde resins) to provide an exterior grade bond. Phenol-formaldehyde resins are typically prepared by reacting a molar excess of formaldehyde with phenol under liquid (e.g., aqueous), alkaline reaction conditions. The resulting liquid phenol-formaldehyde resin is then spray-dried to produce the powdered, curable phenol-formaldehyde resin that is used as an adhesive for making various lignocellulose composite products. Utilizing the powdered, curable phenol-formaldehyde resin in the production of OSB provides a cost advantage over the liquid phenol-formaldehyde resin counterpart.

Other types of lignocellulose composite products, such as particleboard and fiberboard, often use urea-formaldehyde resins to provide an interior grade bond. The urea-formaldehyde resins, however, are typically utilized in a liquid form due in part to the difficulty of providing a urea-formaldehyde resin composition that is capable of being sufficiently spray dried and that is capable of producing lignocellulose composite products that meet or exceed desired physical properties, e.g., internal bond strength.

There is a need, therefore, for improved particulate binder compositions including an amine-aldehyde resin for producing composite products.

SUMMARY

Particulate binder compositions made with amine-aldehyde resins and methods for making and using same are provided. In at least one specific embodiment, the method for making the particulate binder composition can include spray-drying an amine-aldehyde resin having a total aldehyde compound to total amine compound molar ratio of about 1.55:1 to about 1.65:1 to produce a particulate binder composition. The particulate binder composition can have a fusion diameter of about 35 mm to about 70 mm.

In at least one specific embodiment, the method for making the particulate binder composition can include reacting an intermediate amine-aldehyde reaction product having a total aldehyde compound to total amine compound molar ratio of about 1.7:1 to about 1.8:1 with a first amine compound to produce a liquid amine-aldehyde resin having a total aldehyde compound to total amine compound molar ratio of about 1.55:1 to about 1.65:1. The method can also include agitating the liquid amine-aldehyde resin to produce an aerated mixture. The aerated mixture can be spray-dried to produce the particulate binder composition.

In at least one specific embodiment, a method for making a composite product can include combining the particulate binder composition with a plurality of lignocellulose substrates to form a curable mixture. The method can also include at least partially curing the curable mixture to produce a composite product.

DETAILED DESCRIPTION

It has been surprisingly and unexpectedly discovered that a particulate binder composition that includes an amine-aldehyde resin having a total aldehyde compound to total amine compound molar ratio of from about 1.55:1 to about 1.65:1 can have a flow or fusion diameter of about 35 mm to about 70 mm. The amine-aldehyde resin can be produced by combining an amine compound ("first amine compound") with an intermediate amine-aldehyde reaction product having an aldehyde compound to an amine compound ("second amine compound") molar ratio of from about 1.7:1 to about 1.8:1 and a viscosity of about 350 centipoise (cP) to about 450 cP. Combining the amine compound with an intermediate amine-aldehyde reaction product can produce the amine-aldehyde resin having a total aldehyde compound to total amine compound molar ratio of from about 1.55:1 to about 1.65:1. The amine-aldehyde resin can have a viscosity of about 800 cP to about 1,200 cP. The amine-aldehyde resin can be spray-dried to provide the particulate binder composition. The particulate binder composition can be used to produce a lignocellulose composite product or "composite product" that meets particular physical requirements while requiring less amine-aldehyde resin as compared to a comparative lignocellulose composite product utilizing a liquid amine-aldehyde resin counterpart (e.g., before spray-drying).

The particulate binder composition can have a flow or fusion diameter from a low of about 32 mm, about 33 mm, about 34 mm, about 35 mm, about 36 mm, about 38 mm, about 40 mm, about 42 mm, about 44 mm, about 46 mm, about 48 mm, or about 50 mm to a high of about 52 mm, about 54 mm, about 56 mm, about 58 mm, about 60 mm, about 62 mm, about 64 mm, about 66 mm, about 68 mm, or about 70 mm. For example, the particulate binder composition can have a fusion diameter of about 32 mm to about 70 mm, about 34 mm to about 68 mm, about 36 mm to about 66 mm, about 38 mm to about 64 mm, about 40 mm to about 62 mm, about 42 mm to about 60 mm, about 44 mm to about 58 mm, about 46 mm to about 56 mm, about 48 mm to about 54 mm, or about 50 mm to about 52 mm. In another example, the particulate binder composition can have a fusion diameter of at least 32 mm, at least 34 mm, at least 35 mm, at least 36 mm, at least 38 mm, at least 40 mm, at least 42 mm, at least 44 mm, at least 45 mm, at least 46 mm, at least 48 mm, or at least 50 mm and up to about 54 mm, about 56 mm, about 58 mm, about 60 mm, about 62 mm, about 64 mm, about 66 mm, about 68 mm, or about 70 mm. In still another example, the particulate binder composition can have a fusion diameter of less than 70 mm, less than 66 mm, less than 62 mm, less than 58 mm, or less than 54 mm and greater than 32 mm, greater than 36 mm, greater than 40 mm, or greater than 44 mm. The fusion diameter of the powdered or particulate binder compositions can be determined according to the Structural Board Association (SBA) GPAM2771.2 test procedure.

As used herein, the phrases "aldehyde compound(s) to amine compound(s) molar ratio," "molar ratio of the aldehyde compound(s) to amine compound(s)," "total aldehyde compound to total amine compound molar ratio," and "molar ratio of total aldehyde compound to total amine compound," are used interchangeably and refer to the total amount, in moles, of the aldehyde compound(s) combined with the amine compound(s) and assumes no loss of the aldehyde compound(s) or amine compound(s) through volatilization, hydrolysis, or other means. For example, 90.09 grams of a urea-formaldehyde resin produced by reacting 30.03 grams formaldehyde and 60.06 grams urea would be referred to as having a formaldehyde to urea molar ratio of 1:1. Similarly, a 90.09 gram mixture of urea and formaldehyde having a formaldehyde to urea molar ratio of 1:1 would also contain 30.03 grams formaldehyde and 60.06 grams urea.

As discussed and described in more detail below, the intermediate amine-aldehyde reaction product can be produced via a reaction process having one or more steps that can include at least partial methylolation of the amine compound or "second amine compound" followed by condensation or polymerization of the at least partially methylolated amine compound. The first amine compound can be added to the intermediate amine-aldehyde reaction product before, during, and/or after the condensation or polymerization has been slowed, substantially terminated, or terminated. The first amine compound can also be added to the intermediate amine-aldehyde reaction product before, during, and/or after the condensation or polymerization has been initiated. The condensation or polymerization can be slowed, substantially terminated, or terminated by increasing the pH of a reaction mixture undergoing condensation or polymerization. The particular pH that can cause the condensation or polymerization of the reaction mixture to slow, substantially terminate, or terminate and thereby produce the intermediate amine-aldehyde reaction product, can depend, at least in part, on the particular composition of the reaction mixture. For example, the condensation or polymerization of a reaction mixture containing urea and formaldehyde can be substantially terminated or terminated at a pH from about 7 to about 8. Additionally, the condensation or polymerization of a reaction mixture containing urea and formaldehyde can be slowed by increasing the pH to less than 7. In another example, the condensation or polymerization of a reaction mixture containing urea, melamine, and formaldehyde can be substantially terminated or terminated at a pH from about 8 to about 9. The particular conditions, e.g., the temperature and/or pressure of the reaction mixture undergoing condensation or polymerization, the aldehyde compound(s) and/or the amine compound(s) in the reaction mixture, the molar ratios between the aldehyde compound(s) and the amine compound(s), or any combination thereof, can affect the conditions, e.g., temperature and/or pH, that cause the condensation or polymerization reaction to slow, substantially terminate, or terminate.

While not wishing to be bound by theory, it is believed that combining the first amine compound with the intermediate amine-aldehyde reaction product having a molar ratio of about 1.7:1 to about 1.8:1 and having a viscosity of about 350 cP to about 450 cP, can increase the presence or amount of methylolated amine compounds in the amine-aldehyde resin. Increasing the presence of methylolated amine compounds in the amine-aldehyde resin can decrease the presence or amount of low molecular weight amine-aldehyde reaction products in the amine-aldehyde resin. It is believed that the decreased concentrations of low molecular weight amine-aldehyde reaction products can provide a particulate binder composition having an increased flow and/or fusion diameter. Accordingly, the addition of the first amine compound to the intermediate amine-aldehyde reaction product can be referred to as occurring under conditions such that a rate of methylolation is greater than a rate of condensation or polymerization.

Additionally, it is believed that combining the first amine compound with the intermediate amine-aldehyde reaction product can produce an amine-aldehyde resin that contains less than 3 wt %, less than 2 wt %, less than 1.5 wt %, less than 1 wt %, less than 0.7 wt %, less than 0.5 wt %, less than 0.2 wt %, less than 0.1 wt %, less than 0.08 wt %, or less than 0.05 wt % free or unreacted aldehyde compounds. As such, the amine-aldehyde resins as well as lignocellulose composite products made therefrom can exhibit reduced aldehyde emission while still maintaining an increased flow and/or fusion diameter and/or lignocellulose composite product having sufficient strength.

The first amine compound and the intermediate amine-aldehyde reaction product can be combined with one another in any order or sequence to produce the amine-aldehyde resins. For example, the first amine compound can be combined with the intermediate amine-aldehyde reaction product to produce a mixture, where the mixture can be further reacted to produce the amine-aldehyde resin. In another example, a first portion of the first amine compound can be combined with the intermediate amine-aldehyde reaction product to produce a first mixture and a second and/or final portion of the first amine compound can be combined with the first mixture to produce the amine-aldehyde resin.

The intermediate amine-aldehyde reaction product can have a total aldehyde compound to total amine compound molar ratio of about 1.6:1 to about 1.9:1. For example, the intermediate amine-aldehyde reaction product can have a total aldehyde compound to total amine compound molar ratio of from a low of about 1.6:1, about 1.61:1, about 1.62:1, about 1.63:1, about 1.64:1, about 1.65:1, about 1.66:1, about 1.67:1, about 1.68:1, about 1.69:1, about 1.70:1, about 1.71:1, about 1.72:1, about 1.73:1, about 1.74:1, or about 1.75:1 to a high of about 1.76:1, about 1.77:1, about 1.78:1, about 1.79:1, about 1.80:1, about 1.81:1, about 1.82:1, about 1.83:1, about 1.84:1, about 1.85:1, 1.86:1, about 1.87:1, about 1.88:1, about 1.89:1, or about 1.90:1. In another example, the intermediate amine-aldehyde reaction product can have a total aldehyde compound to total amine compound molar ratio of about 1.6:1 to about 1.9:1, about 1.61:1 to about 1.89:1, about 1.62:1 to about 1.88:1, about 1.63:1 to about 1.87:1, about 1.64:1 to about 1.86:1, about 1.65:1 to about 1.85:1, about 1.66:1 to about 1.84:1, about 1.67:1 to about 1.83:1, about 1.68:1 to about 1.82:1, about 1.69:1 to about 1.81:1, about 1.70:1 to about 1.80:1, about 1.71:1 to about 1.79:1, about 1.72:1 to about 1.78:1, about 1.73:1 to about 1.77:1, or about 1.74:1 to about 1.76:1.

Depending on the particular molar ratio of the aldehyde compound(s) to the amine compound(s) in the intermediate amine-aldehyde reaction product, the amount of the first amine compound combined therewith can be sufficient to produce the amine-aldehyde resin having a total aldehyde compound to total amine compound molar ratio of about 1.5:1 to about 1.7:1. For example, the amine-aldehyde resin can have a total aldehyde compound to total amine compound molar ratio from a low of about 1.5:1, about 1.51:1 about 1.52:1, about 1.53:1, about 1.54:1, about 1.55:1, about 1.56:1, about 1.57:1, about 1.58:1, about 1.59:1, or about 1.6:1 to a high of about 1.61:1, about 1.62:1, about 1.63:1, about 1.64:1, about 1.65:1, about 1.66:1, about 1.67:1, about 1.68:1, about 1.69:1, or about 1.7:1. In another example, the amine-aldehyde resin can have a total aldehyde compound to total amine compound molar ratio of about 1.5:1 to about 1.7:1, about 1.52:1 to about 1.68:1, about 1.54:1 to about 1.66:1, about 1.56:1 to about 1.64:1, or about 1.58:1 to about 1.62:1. In another example, the amine-aldehyde resin can have total aldehyde compound to total amine compound molar ratio of about 1.5:1 to less than 1.7:1, about 1.52:1 to less than 1.68:1, about 1.54:1 to less than 1.66:1, about 1.56:1 to less than 1.64:1, or about 1.58:1 to less than 1.62:1. In another example, the amine-aldehyde resin can have a total aldehyde compound to total amine compound molar ratio of greater than 1.5:1 to about 1.7:1, greater than 1.52:1 to about 1.68:1, greater than 1.54:1 to about 1.66:1, greater than 1.56:1 to about 1.64:1, or greater than 1.58:1 to about 1.62:1.

The amine-aldehyde resin can have a concentration of the first amine compound from a low of about 0.1 wt %, about 0.5 wt %, about 1 wt %, about 2 wt %, about 3 wt %, or about 4 wt % to high of about 8 wt %, about 10 wt %, about 12 wt %, about 14 wt %, about 16 wt %, about 20 wt %, about 23 wt %, or about 25 wt %, based on the total weight of the aldehyde compounds and the amine compounds in the amine-aldehyde resin. For example, the amount of the first amine compound in the amine-aldehyde resin can be about 0.1 wt % to about 20 wt %, about 1 wt % to about 12 wt %, about 2 wt % to about 6 wt %, about 3 wt % to about 9 wt %, about 2 wt % to about 15 wt %, or about 3 wt % to about 18 wt %, based on the total weight of aldehyde compounds and amine compounds in the amine-aldehyde resin. In another example, the amine-aldehyde resin can have a concentration of the first amine compound from a low of about 0.1 wt %, about 0.3 wt %, about 0.5 wt %, about 0.7 wt %, about 1 wt %, about 1.5 wt %, about 1.7 wt %, about 2 wt %, about 2.3 wt %, about 2.5 wt %, about 2.7 wt %, or about 3 wt % to a high of about 3.3 wt %, about 3.5 wt %, about 3.7 wt %, about 4 wt %, about 4.3 wt %, about 4.5 wt %, about 4.7 wt %, about 5 wt %, about 5.3 wt %, about 5.5 wt %, about 5.7 wt %, or about 6 wt %. In another example, the amount of the first amine compound in the amine-aldehyde resin can be about 0.1 wt % to about 6 wt %, about 1.3 wt % to about 5.7 wt %, about 1 wt % to about 5 wt %, about 1.5 wt % to about 4.5 wt %, about 1.7 wt % to about 4.3 wt %, about 2 wt % to about 4 wt %, about 2.3 wt % to about 3.7 wt %, about 2.5 wt % to about 3.5 wt %, or about 2.7 wt % to about 3.3 wt %.

The amine-aldehyde resin can be mixed with a liquid medium or can be in powdered or dried form. Illustrative liquid mediums can include, but are not limited to, water, methanol, acetonitrile, or any combination thereof. The amine-aldehyde resin combined with a liquid medium can have a total concentration of solids ranging from about 1 wt % to about 99 wt %. For example, the amine-aldehyde resin combined with a liquid medium can have a concentration of solids from a low of about 0.5 wt %, about 1 wt %, about 1.5 wt %, about 2 wt %, about 2.5 wt %, about 3 wt %, about 3.5 wt %, about 4 wt %, about 4.5 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt % to a high of about 65 wt %, about 70 wt %, about 75 wt %, about 80 wt %, about 85 wt %, or about 90 wt %. In another example, the amine-aldehyde resin combined with a liquid medium can have a concentration of solids from about 50 wt % to about 90 wt %, about 55 wt % to about 85 wt %, about 60 wt % to about 80 wt %, about 65 wt % to about 75 wt %, about 66 wt % to about 74 wt %, about 67 wt % to about 73 wt %, about 67 wt % to about 72 wt %, about 68 wt % to about 71 wt %, or about 69 wt % to about 70 wt %. As used herein, the solids content of an amine-aldehyde resin combined with a liquid medium, as understood by those skilled in the art, can be measured by determining the weight loss upon heating a small sample, e.g., 1-5 grams, of the amine-aldehyde resin to a suitable temperature, e.g., 105° C., and a time sufficient to remove the liquid medium. By measuring the weight of the sample before and after heating, the percent solids in the sample can be directly calculated or otherwise estimated.

The amine-aldehyde resin can have a viscosity of about 800 centipoise ("cP") to about 1,200 cP at a temperature of 25° C. For example, the amine-aldehyde resin can have a viscosity from a low of about 800 cP, about 850 cP, about 900 cP, about 950 cP, or about 1,000 cP to a high of about 1,050 cP, about 1,100 cP, about 1,150 cP, or about 1,200 cP at a temperature of 25° C. In another example, the amine-aldehyde resin can have a viscosity of about 800 cP to about 1,200 cP, about 850 cP to about 1,150 cP, about 900 cP to about 1,100 cP, about 950 cP, to about 1,050 cP, about 1,000 cP to about 1,050 cP at a temperature of 25° C. In at least one example, the amine-aldehyde resin can have a viscosity of about 900 cP. In another example, the amine-aldehyde resin can have a Gardner-Holdt viscosity of about W, when measured at a temperature of 25° C.

The intermediate amine-aldehyde reaction product, the amine-aldehyde resin, and the first amine-compound, can include one or more amine compounds. The one or more amine compounds can include, but are not limited to, urea, melamine, or a combination thereof. Urea can be provided in many forms. For example, solid urea, such as prill, and/or urea solutions, such as aqueous urea solutions, can be used. Further, urea can be combined with another moiety, for example, formaldehyde and/or urea-formaldehyde adducts, often in aqueous solution. Solid urea, solutions of urea, and/or urea combined with another moiety can be used. In another example, the urea can be or include a pre-reacted urea-formaldehyde mixture having a urea to formaldehyde weight ratio of about 1:2 to about 1:3. Illustrative urea-formaldehyde products can include, but are not limited to, Urea-Formaldehyde Concentrate ("UFC"). These types of products can be as discussed and described in U.S. Pat. Nos. 5,362,842 and 5,389,716, for example. Any of these forms of urea, alone or in any combination, can be used to prepare the amine-aldehyde resin.

Melamine can also be provided in many forms. For example, solid melamine, such as prill and/or melamine solutions can be used. Although melamine is specifically referred to, the melamine can be totally or partially replaced with other aminetriazine compounds. Other suitable aminetriazine compounds can include, but are not limited to, substituted melamines, cycloaliphatic guanamines, combinations thereof, or any mixture thereof. Substituted melamines include the alkyl melamines and aryl melamines that can be mono-, di-, or tri-substituted. In the alkyl substituted melamines, each alkyl group can contain 1-6 carbon atoms, such as, for example, 1-4 carbon atoms. Illustrative examples of the alkyl-substituted melamines can include, but are not limited to, monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals, such as, for example, one phenyl radical. Illustrative examples of aryl-substituted melamines can include, but are not limited to, monophenyl melamine and diphenyl melamine. Any of the cycloaliphatic guanamines can also be used. Suitable cycloaliphatic guanamines can include those having 15 or less carbon atoms. Illustrative cycloaliphatic guanamines can include, but are not limited to, tetrahydrobenzoguanamine, hexahydrobenzoguanamine, 3-methyl-tetrahydrobenzoguanamine, 3-methylhexahydrobenzoguanamine, 3,4-dimethyl-1,2,5,6-tetrahydrobenzoguanamine, and 3,4-dimethyl-hexahydrobenzoguanamine and mixtures thereof. Mixtures of aminetriazine compounds can include, for example, melamine and an alkyl-substituted melamine, such as dimethyl melamine, or melamine and a cycloaliphatic guanamine, such as tetrahydrobenzoguanamine.

The intermediate amine-aldehyde reaction product can include one or more aldehyde compounds. The one or more aldehyde compounds can include, but are not limited to, unsubstituted aldehyde compounds and/or substituted aldehyde compounds. For example, suitable aldehyde compounds can be represented by the formula RCHO, wherein R is hydrogen or a hydrocarbon radical. Illustrative hydrocarbon radicals can include from 1 to about 8 carbon atoms. In another example, suitable aldehyde compounds can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, any combination thereof, or any mixture thereof. One or more other aldehydes, such as glyoxal can be used in place of or in combination with formaldehyde and/or other aldehydes. In at least one example, the aldehyde compound can include formaldehyde, UFC, or a combination thereof.

The aldehyde can be used in many forms such as solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 wt %, 44 wt %, or 50 wt % formaldehyde concentrations), UFC, and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

The intermediate amine-aldehyde reaction product can be produced in a reaction vessel by reacting one or more aldehyde compounds with one or more amine compounds in one or more reaction steps. A first reaction step can be carried out under basic/alkaline reaction conditions or acidic reaction conditions to produce a first intermediate amine-aldehyde reaction product or "first intermediate." For example, the first reaction step can include reacting one or more aldehyde compounds with one or more amine compounds or "second amine compounds" under basic reaction conditions (a pH of about 7 or greater) to produce the first intermediate. In another example, the first reaction step can include reacting one or more aldehyde compounds with the second amine compound under acidic reaction conditions (a pH of less than 7) to produce the first intermediate. The second reaction step can include reacting the first intermediate under acidic reaction conditions to produce a second intermediate reaction product or the "intermediate amine-aldehyde reaction product." The first reaction step, whether carried out under basic or acidic conditions can be referred to as a methylolation reaction or a methylolation reaction step. The second reaction step can be referred to as a condensation reaction or condensation reaction step. As such, the second intermediate reaction product or intermediate amine-aldehyde reaction product can also be referred to as an "intermediate condensation product" or "intermediate amine-aldehyde condensation product."

Preparation of the First Intermediate

The aldehyde compound and the second amine compound can be mixed, blended, or otherwise combined with one another to produce a reactant mixture that can be reacted under acidic reaction conditions to produce the first intermediate. The first intermediate can be produced by reacting the aldehyde compound, e.g., formaldehyde, and the second amine compound, e.g., urea and/or melamine, under acidic reaction conditions at a pH of less than 7. For example, the aldehyde compound and the second amine compound can be reacted at a pH from a low of about 1, about 2, about 2.5, about 3, about 3.5, about 4, or about 4.5 to a high of about 5, about 5.5, about 6, about 6.5, about 6.7, or about 6.9. In another example, the reactant mixture can be reacted at a pH of about 1.5 to about 6.9, about 5 to about 6.5, about 6 to about 6.9, about 6.2 to about 6.9, or about 6.4 to about 6.9. In another example, the aldehyde compound and the second amine compound can be reacted at a pH from a low of about 5, about 5.1, about 5.2, about 5.3, about 5.4, about 5.5 about 5.6, about 5.7, about 5.8, about 5.9, or about 6 to a high of about 6.1, about 6.2, about 6.3, about 6.4, about 6.5, about 6.6, about 6.7, about 6.8, or about 6.9. In another example, the aldehyde compound and the second amine compound can be reacted at a pH of about 5 to less than 7, about 5.5 to less than 6.9, about 6 to less than 6.9, about 6.2 to less than 6.9, or about 6.2 to less than 6.9. Reacting the aldehyde compound and the second amine compound can produce a first intermediate in which at least a portion of the amine compound has been methylolated. In other words, the first intermediate can include methylolated amine compounds.

The aldehyde compound and the second amine compound can be combined with one another at a molar ratio ranging from about 1.5:1 to about 3:1. For example, the molar ratio of the aldehyde compound to the second amine compound in the reactant mixture can be from a low of about 1.5:1, about 1.6:1, about 1.7:1, about 1.72:1, about 1.74:1, about 1.76:1, about 1.78:1, about 1.8:1, about 1.82:1, about 1.84:1, about 1.86:1, or about 1.88:1 to a high of about 1.9:1, about 1.92:1, about 1.94:1, about 1.96:1, about 1.98:1, about 2:1, about 2.02:1, about 2.04:1, about 2.06:1, about 2.08:1, about 2.1:1, about 2.12:1, about 2.14:1, about 2.16:1, about 2.18:1, about 2.2:1, about 2.3:1, about 2.4:1, about 2.5:1, about 2.6:1, about 2.7:1, about 2.8:1, about 2.9:1, or about 3:1. In another example, the molar ratio of the aldehyde compound to the second amine compound in the reactant mixture can be of about 1.5:1 to about 2.2:1, about 1.6:1 to about 2:1, about 1.7:1 to about 2:1, about 1.8:1 to about 1.98:1, about 1.86:1 to about 1.94:1, about 1.88:1 to about 1.92:1. In another example, the molar ratio of the aldehyde compound to the second amine compound in the reactant mixture can be about 1.5:1 to less than 2.2:1, about 1.6:1 to less than 2:1, about 1.7:1 to less than 2:1, about 1.8:1 to less than 1.98:1, about 1.86:1 to less than 1.94:1, about 1.88:1 to less than 1.92:1.

Prior to, during, and/or after the reaction between the aldehyde compound and the second amine compound, one or more acidic compounds can be added to maintain and/or adjust (e.g., reduce) the pH of the reaction mixture and/or the first intermediate. Suitable acids can include, but are not limited to, one or more mineral acids, one or more organic acids, one or more acid salts, or any combination thereof. Illustrative mineral acids can include, but are not limited to, hydrochloric acid, nitric acid, phosphoric acid, sulfuric acid, any combination thereof, or any mixture thereof. Illustrative organic acids can include, but are not limited to, acetic acid, formic acid, citric acid, oxalic acid, uric acid, lactic acid, any combination thereof, or any mixture thereof. Illustrative acid salts can include, but are not limited to, ammonium sulfate, sodium bicarbonate, sodium hydrosulfide, sodium bisulfate, sodium metabisulfite, any combination thereof, or any mixture thereof.

Prior to, during, and/or after the reaction between the aldehyde compound and the second amine compound, one or more bases or alkaline compounds can be added to maintain and/or adjust (e.g., increase) the pH thereof. Suitable bases or alkaline compounds can include, but are not limited to, hydroxides, carbonates, ammonia, amines, any combination thereof, or any mixture thereof. Illustrative hydroxides can include, but are not limited to, sodium hydroxide, potassium hydroxide, ammonium hydroxide (e.g., aqueous ammonia), lithium hydroxide, cesium hydroxide, aqueous solutions thereof, any combination thereof, or any mixture thereof. Illustrative carbonates can include, but are not limited to, sodium carbonate, potassium carbonate, ammonium carbonate, aqueous solutions thereof, any combination thereof, or any mixture thereof. Illustrative amines can include, but are not limited to, alkanolamines, polyamines, aromatic amines, any combination thereof, or any mixture thereof. Illustrative alkanolamines can include, but are not limited to, monoethanolamine ("MEA"), diethanolamine ("DEA"), triethanolamine ("TEA"), any combination thereof, or any mixture thereof. In some examples, the alkanolamine can be a tertiary alkanolamine, such as triethanolamine. An alkanolamine is defined as a compound that has both amine and hydroxyl functional groups as illustrated by diethanolamine, triethanolamine, 2-(2-aminoethoxy)ethanol, aminoethyl ethanolamine, aminobutanol and other aminoalkanols. Illustrative aromatic amines can include, but are not limited to, benzyl amine, aniline, ortho toludine, meta toludine, para toludine, n-methyl aniline, N—N'-dimethyl aniline, di- and tri-phenyl amines, 1-naphthylamine, 2-naphthylamine, 4-aminophenol, 3-aminophenol and 2-aminophenol, any combination thereof, or any mixture thereof. Illustrative polyamines can include, but are not limited to, diethylenetriamine ("DETA"), triethylenetetramine ("TETA"), tetraethylenepentamine ("TEPA"), any combination thereof or any mixture thereof. Other polyamines can include, for example, 1,3-propanediamine, 1,4-butanediamine, polyamidoamines, polyethyleneimines, any combination thereof, or any mixture thereof.

Other suitable amines can include, but are not limited to, primary amines ("$NH_2R_1$"), secondary amines ("$NHR_1R_2$"), and tertiary amines ("$NR_1R_2R_3$"), where each $R_1$, $R_2$, and $R_3$ can be independently selected from alkyls, cycloalkyls, heterocycloalkyls, aryls, heteroaryls, and substituted aryls. The alkyl can include branched or unbranched alkyls that can have 1 to about 15 carbon atoms or more, such as, for example, 1 carbon atom to about 8 carbon atoms. Illustrative alkyls can include, but are not limited to, methyl, ethyl, n-propyl, isopropyl, n-butyl, sec butyl, t-butyl, n-pentyl, n-hexyl, and ethylhexyl. The cycloalkyls can include about 3 to about 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In one or more embodiments, aryl substituents can have 1 carbon atom to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amine, halo, silyl, and the like. Illustrative primary amines can include, but are not limited to, methylamine and ethylamine. Illustrative secondary amines can include, but are not limited to, dimethylamine and diethylamine. Illustrative tertiary amines can include, but are not limited to, trimethylamine and triethylamine.

In addition to controlling or adjusting the pH, some base compounds can act as a pH buffer, which can improve and/or maintain a desired pH during the reaction of the reactant mixture. Illustrative bases that can also act as a pH buffer can include, but are not limited to, triethanolamine, sodium borate, potassium bicarbonate, sodium carbonate, potassium carbonate, any combination thereof, or any mixture thereof.

The reaction of the reactant mixture can be maintained at any desired temperature. For example, the reactant mixture can be maintained at a temperature from about room temperature (e.g., 25° C.) to about 100° C. For example, heat or thermal energy from the exothermic reaction of the reactant mixture can be allowed to heat the reaction mixture to a temperature from a low of about 50° C., about 55° C., about 60° C., about 65° C., or about 70° C. to a high of about 75° C., about 80° C., about 85° C., about 90° C., about 91° C., about 92° C., about 93° C., about 94° C., about 95° C., about 96° C., about 97° C., about 98° C., about 99° C., about 100° C., about 101° C., about 102° C., about 103° C., about 104° C., about 105° C., about 106° C., about 107° C., about 108° C., about 109° C., or about 110° C. In another example, heat from the exothermic reaction of the reactant mixture can be allowed to heat the reaction mixture to a temperature of about 50° C. to about 110° C., about 55° C. to about 108° C., about 60° C. to about 106° C., about 65° C. to about 104° C., or about 70° C. to about 100° C. The aldehyde compound can be combined with the second amine compound at a rate suitable for controlling the heat generated by the reaction. For example, the second amine compound can be added to the aldehyde compound in separate portions or batches, continuously over a suitable period of time, or a combination thereof, such that the temperature of the reaction mixture is maintained at a desired temperature. In another example, one or more cooling devices can be disposed about and/or within the vessel and/or the reaction mixture thereby transferring and/or absorbing heat from the reaction mixture.

The reactant mixture can be reacted for any desired length or amount of time. For example, the reactant mixture can be reacted for a time from a low of about 1 minute (min), about 5 min, about 10 min, or about 15 min to a high of about 30 min, about 1 hour, about 2 hours, or about 3 hours. In another example, the reactant mixture can be reacted for about 15 min, about 16 min, about 17 min, about 18 min, about 19 min, about 20 min, about 21 min, about 22 min, about 23 min, about 24 min, about 25 min, about 26 min, about 27 min, about 28 min, about 29 min, about 30 min, about 35 min, or about 40 min.

Increasing and/or decreasing the pH and/or temperature of the reaction of the aldehyde compound and the second amine compound can determine, at least in part, the production or reaction rate for the first intermediate. Further, increasing and/or decreasing the pH and/or temperature of the reaction of the aldehyde compound and the second amine compound can determine, at least in part, the properties (e.g., viscosity and/or water tolerance) of the first intermediate. Accordingly, the reaction of the aldehyde compound and the second amine compound can be carried out or conducted in one or more stages having the same or different reaction conditions with respect to one another. For example, a first stage of the reaction can include reacting the aldehyde compound and the second amine compound at an elevated pH (e.g., pH of about 6.2 to about 6.6) and at an elevated temperature (e.g., about 100° C.). The first stage of the reaction can be carried out until one or more desired properties (e.g., viscosity and/or water tolerance) are exhibited. A second stage of the reaction can include adjusting the pH and/or temperature until one or more desired properties are exhibited. For example, the second stage of the reaction can include decreasing the pH (e.g., pH of about 5.3 to about 5.5) to increase the rate of the reaction. In another example, the second stage of the reaction can include decreasing the temperature (e.g., less than 95° C.) to decrease the rate of the reaction. The temperature and/or pH conditions of the one or more stages of the reaction can be the same or different with respect to one another.

The reaction vessel can be any container or container system suitable for reacting the aldehyde compound and the second amine compound with one another. For example, the reaction vessel can include an open body or container or an enclosed body or container capable of carrying out the reaction under vacuum, at atmospheric pressure, and/or at a pressure greater than atmospheric pressure. The reaction vessel can include cooling coils, heating coils, or other cooling and/or heating devices or systems. The reaction vessel can include one or more mixing devices.

The reaction of the reactant mixture can be carried out in a liquid medium. For example, the reaction of the reactant mixture can be carried out in water (e.g., an aqueous mixture). In another example, the reaction of reactant mixture can be carried out in a non-aqueous liquid medium or solvent. Illustrative solvents can include, but are not limited to, methanol, acetonitrile, or combination thereof. In another example, the reaction of the reactant mixture can be carried out in a mixture of water and one or more non-aqueous liquid medium or solvent (e.g., methanol).

The aldehyde compound and the second amine compound, and, if used, the acidic and/or alkaline compounds, can be combined with one another in any order or sequence. For example, the aldehyde compound can be introduced to a reaction vessel and the second amine compound can be added thereto. In another example, the second amine compound can be added to the reaction vessel and the aldehyde compound can be added thereto. In another example, the aldehyde compound and the second amine compound can be simultaneously added to the reaction vessel. If the acidic and/or alkaline compounds are used, the acidic and/or alkaline compounds can be added to the reaction vessel at any desired time (e.g., before, during, and/or after) with respect to the aldehyde compound and the second amine compound. For example, the acidic and/or alkaline compounds can be added to the reaction vessel before the second aldehyde compound and/or the second amine compound, simultaneously with the aldehyde compound and/or the second amine compound, and/or after the aldehyde compound and/or second first amine compound.

The first intermediate can include the aldehyde compound, the second amine compound, a methylolated amine compound, or any combination thereof. For example, in the context of a first intermediate produced by reacting formaldehyde and urea under alkaline reaction conditions, the first intermediate can include formaldehyde, urea, methylolated urea, any combination thereof, or any mixture thereof. The methylolated urea can include monomethylolurea, dimethylolurea, trimethylolurea, any combination thereof, or any mixture thereof.

The reaction between the aldehyde compound and the second amine compound can be carried out to produce the first intermediate having a desired viscosity. For example, the first intermediate can have a viscosity of about 100 cP to about 300 cP at a temperature of 25° C. For example, the first intermediate produced can have a viscosity from a low of about 100 cP, 110 cP, about 120 cP, 130 cP, about 140 cP, about 150 cP, about 160 cP, about 170 cP, about 180 cP, about 185 cP, about 190 cP, about 195 cP, or about 200 cP to a high of about 205 cP, about 210 cP, about 215 cP, about 220 cP, about 230 cP, about 240 cP, about 250 cP, about 260 cP, about 270 cP, about 280 cP, about 290 cP, or about 300 cP at a temperature of 25° C. In another example, the first intermediate produced can have a viscosity of about 100 cP to about 300 cP, about 110 cP to about 290, about 120 cP to about 280 cP, about 130 cP to about 270 cP, about 140 cP to about 260 cP, about 150 cP to about 250 cP, about 160 cP to about 240 cP, about 170 cP to about 230 cP, about 180 cP to about 220 cP, about 185 cP to about 215 cP, about 190 cP to about 210 cP, or about 195 cP to about 205 cP at a temperature of 25° C. In another example, the first intermediate can have a viscosity, when measured by Gardner-Holdt method, of about H to about I, when measured at a temperature of 25° C.

Preparation of the Intermediate Amine-Aldehyde Reaction Product

The first intermediate produced via basic reaction conditions or acidic reaction conditions can be further reacted under acidic conditions to produce the second intermediate reaction product or the intermediate amine-aldehyde reaction product. The reaction of the first intermediate under acidic conditions can polymerize or condense the first intermediate product to produce the intermediate amine-aldehyde reaction product. As such, the reaction of the first intermediate product to produce the intermediate amine-aldehyde reaction product can be referred to as a condensation or polymerization reaction.

If the first intermediate is produced under basic reaction conditions, one or more acids can be combined with the first intermediate in a sufficient amount to reduce the pH thereof to less than 7. If the first intermediate is produced under acidic reaction conditions, one or more acids can be combined with the first intermediate to adjust the pH thereof to less than 7. The pH of the first intermediate can be adjusted such that the first intermediate has a pH of about 3 to about 7 or less than 7. For example, the pH of the first intermediate can be reduced to a pH from a low of about 1, about 2, about 2.5, about 3, about 3.5, about 4, or about 4.5 to a high of about 5, about 5.5, about 6, about 6.5, about 6.7, or about 6.9. In another example, the pH of the first intermediate can be reduced to a pH of about 1.5 to about 6.9, about 5 to about 6.5, about 6 to about 6.9, about 6.2 to about 6.9, or about 6.4 to about 6.9. In another example, the pH of the first intermediate can be reduced to a pH from a low of about 5, about 5.1, about 5.2, about 5.3, about 5.4, about 5.5 about 5.6, about 5.7, about 5.8, about 5.9, or about 6 to a high of about 6.1, about 6.2, about 6.3, about 6.4, about 6.5, about 6.6, about 6.7, about 6.8, or about 6.9. In another example, the pH of the first intermediate can be reduced to a pH of about 5 to less than 7, about 5.5 to less than 6.9, about 6 to less than 6.9, about 6.2 to less than 6.9, or about 6.2 to less than 6.9. Increasing and/or decreasing the pH of the first intermediate can determine, at least in part, the production or reaction rate for the intermediate amine-aldehyde reaction product. For example, increasing the pH of the first intermediate can reduce or decrease the formation or production rate of the intermediate amine-aldehyde reaction product. Similarly, decreasing the pH of the first intermediate can increase the formation or production rate of the intermediate amine-aldehyde reaction product.

Additionally, one or more additional amine compounds (e.g., "third amine compound," and/or "fourth amine compound") can be added to the reactant mixture during, and/or after reaction of the reactant mixture in order to adjust the total aldehyde compound to total amine compound molar ratio. For example, the reactant mixture can have an initial molar ratio of the aldehyde compound to the second amine compound of about 1.5:1 to about 3:1. Adding the third amine compound can adjust the molar ratio of the aldehyde compound to the combined amount of the second and third amine compounds to a low of about 1.5:1, about 1.6:1, about 1.7:1, about 1.71:1, about 1.72:1, about 1.73:1, about 1.74:1, about 1.75:1, about 1.76:1, about 1.77:1, about 1.78:1, about 1.79:1, about 1.8:1, about 1.81:1, about 1.82:1, about 1.83:1, about 1.84:1, about 1.85:1, about 1.86:1, about 1.87:1, about 1.88:1, or about 1.89:1 to a high of about 1.9:1, about 1.91:1, about 1.92:1, about 1.93:1, about 1.94:1, about 1.95:1, about 1.96:1, about 1.97:1, about 1.98:1, about 1.99:1, about 2:1, about 2.01:1, about 2.02:1, about 2.03:1, about 2.04:1, about 2.05:1, about 2.06:1, about 2.07:1, about 2.08:1, about 2.09:1, about 2.1:1, about 2.11:1, about 2.12:1, about 2.13:1, about 2.14:1, about 2.15:1, about 2.16:1, about 2.17:1, about 2.18:1, about 2.19:1, about 2.2:1, about 2.3:1, about 2.4:1, about 2.5:1, about 2.6:1, about 2.7:1, about 2.8:1, about 2.9:1, or about 3:1. In another example, adding the third amine compound can adjust the molar ratio of the aldehyde compound to the combined amount of the second and third amine compounds to about 1.5:1 to about 2.2:1, about 1.6:1 to about 2:1, about 1.7:1 to about 2:1, about 1.8:1 to about 1.98:1, about 1.86:1 to about 1.94:1, about 1.88:1 to about 1.92:1. In another example, adding the third amine compound can adjust the molar ratio of the aldehyde compound to the combined amount of the second and third amine compounds to about 1.5:1 to less than 2.2:1, about 1.6:1 to less than 2:1, about 1.7:1 to less than 2:1, about 1.8:1 to less than 1.98:1, about 1.86:1 to less than 1.94:1, about 1.88:1 to less than 1.92:1. The third amine compound can include any amine compound discussed and described above or elsewhere herein. For example, the third amine compound can include, but is not limited to, urea, melamine, any combination thereof, or any mixture thereof.

The reaction of the first intermediate under acidic conditions can polymerize or condense the first intermediate product to produce the intermediate amine-aldehyde reaction product. As such, the reaction of the first intermediate product to produce the intermediate amine-aldehyde reaction product can be referred to as a condensation or polymerization reaction. The reaction of the first intermediate under acidic conditions can be carried out or continued until the intermediate amine-aldehyde reaction product exhibits one or more desired properties. Illustrative properties can include, but are not limited to, viscosity, water dilutabilty or water tolerance, or a combination thereof. The reaction (e.g., polymerization or condensation reaction) of the first intermediate under acidic conditions can be monitored using a water tolerance test, viscosity measurements, or a combination thereof.

A water tolerance test can be performed on the first intermediate and/or the intermediate amine-aldehyde reaction product to measure miscibility with water and/or molecular weight thereof. The water tolerance test, as understood by those skilled in the art, can include adding one or more aliquots or portions of distilled water at a temperature of 25° C. to a small sample, e.g., 10 grams, until the sample becomes turbid. A higher water tolerance value for a sample can indicate a lower molecular weight with respect to another sample.

The reaction (e.g., polymerization or condensation reaction) of the first intermediate can be carried out to produce the intermediate amine-aldehyde reaction product having a desired water tolerance. For example, the intermediate amine-aldehyde reaction product can be diluted to a concentration from a low of about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, about 15 wt %, or about 20 wt % to a high of about 25 wt %, about 30 wt %, about 35 wt %, about 40 wt %, or about 50 wt %, based on the total weight of the intermediate amine-aldehyde reaction product and the water, before the solution becomes turbid.

The reaction (e.g., polymerization or condensation reaction) of the first intermediate can be carried out to produce the intermediate amine-aldehyde reaction product having a desired viscosity. The viscosity of the intermediate amine-aldehyde reaction product can be from a low of about 300 cP to a high of about 500 cP at a temperature of 25° C. For example, the viscosity of the intermediate amine-aldehyde reaction product can be from a low of about 300 cP, about 310 cP, about 320 cP, about 330 cP, about 340 cP, about 350 cP, about 360 cP, about 370 cP, about 380 cP, about 385 cP, about 390 cP, about 395 cP, or about 400 cP to a high of about 405 cP, about 410 cP, about 415 cP, about 420 cP, about 430 cP, about 440 cP, about 450 cP, about 460 cP, about 470 cP, about 480 cP, about 490 cP, or about 500 cP at a temperature of 25° C. In another example, the viscosity of the intermediate amine-aldehyde reaction product can be of about 300 cP to about 500 cP, about 310 cP to about 490 cP, about 320 cP to about 480 cP, about 330 cP to about 470 cP, about 340 cP to about 460 cP, about 350 cP to about 450 cP, about 360 cP to about 440 cP, about 370 cP to about 430 cP, about 380 cP to about 420 cP, about 385 cP to about 415 cP, about 390 cP to about 410 cP, or about 395 cP to about 405 cP at a temperature of 25° C. In another example, the intermediate amine-aldehyde reaction product can have a viscosity, when measured by Gardner-Holdt method, of at least P, when measured at a temperature of 25° C.

The reaction of the first intermediate can be carried out under acidic conditions at any desired temperature or range of temperatures to produce the intermediate amine-aldehyde reaction product. For example, the first intermediate can be reacted at room temperature (e.g., 25° C.) under acidic conditions. In another example, the reaction of the first intermediate under acidic conditions can be carried out at a temperature from a low of about 50° C., about 55° C., about 60° C., about 65° C., about 70° C., about 72° C., about 74° C., about 76° C., about 78° C., or about 80° C. to a high of about 82° C., about 84° C., about 86° C., about 88° C., about 90° C., about 92° C., about 94° C., about 96° C., about 98° C., or about 100° C. In another example, the reaction of the first intermediate under acidic conditions can be carried out at a temperature of about 70° C. to about 90° C., about 72° C. to about 88° C., about 74° C. to about 86° C., about 76° C. to about 84° C., or about 78° C. to about 82° C. In another example, the reaction of the first intermediate under acidic conditions can be carried out at a temperature of about 90° C. to about 100° C., about 91° C. to about 99° C., about 92° C. to about 98° C., about 93° C. to about 97° C., or about 94° C. to about 96° C. Exothermic heat generated during the condensation reaction can be used to heat the reaction mixture. In another example, the reaction can be initiated or started at an elevated temperature (e.g., about 90° C. to about 100° C.) and cooled to a lower temperature (e.g., about 70° C. to about 90° C.). Increasing and/or decreasing the temperature of the first intermediate can determine, at least in part, the production or reaction rate for the intermediate amine-aldehyde reaction product. For example, increasing the temperature of the first intermediate can increase the formation or production rate of the intermediate amine-aldehyde reaction product. Similarly, decreasing temperature of the first intermediate can decrease the formation or production rate of the intermediate amine-aldehyde reaction product.

The reaction of the first intermediate under acidic conditions can be carried out for any desired length or amount of time. For example, the reaction can be carried out for a time from a low of about 30 minutes, about 45 minutes, or about 1 hour to a high of about 2 hours, about 3 hours, about 4 hours, or about 5 hours. The reaction time of the first intermediate under acidic conditions can depend, at least in part, on the desired properties (e.g., water tolerance and/or viscosity) of the intermediate amine-aldehyde reaction product. The reaction time of the first intermediate under acidic conditions can also depend, at least in part, on the reaction temperature and/or the pH of the first intermediate product.

As discussed above, increasing and/or decreasing the pH and/or temperature of the reaction of the first intermediate under acidic conditions can determine, at least in part, the production or reaction rate for the intermediate amine-aldehyde reaction product. Further, increasing and/or decreasing the pH and/or temperature of the reaction of the first intermediate under acidic conditions can determine, at least in part, the properties (e.g., viscosity and/or water tolerance) of the intermediate amine-aldehyde reaction product. Accordingly, the reaction of the first intermediate under acidic conditions can be carried out or conducted in one or more stages having the same or different reaction conditions with respect to one another. For example, a first stage of the reaction can include reacting the first intermediate at a reduced pH (e.g., pH of about 5.4) and at an elevated temperature (e.g., about 95° C. to about 100° C.). The first stage of the reaction can be carried out until one or more desired properties (e.g., viscosity and/or water tolerance) are exhibited. A second stage of the reaction can include adjusting the pH and/or temperature until one or more desired properties are exhibited. For example, the second stage of the reaction can include increasing the pH (e.g., pH of about 5.6) to decrease the rate of the reaction. In another example, the second stage of the reaction can include decreasing the temperature (e.g., about 80° C.) to decrease the rate of the reaction. The temperature and/or pH conditions of the one or more stages of the reaction can be the same or different with respect to one another.

When the condensation or polymerization of the first intermediate has been completed or the desired properties are achieved, the pH of the reaction mixture can be increased to provide the intermediate amine-aldehyde reaction product. Increasing the pH can substantially terminate, terminate, or slow the condensation or polymerization of the reaction mixture, thereby providing the intermediate amine-aldehyde reaction product. For example, the pH can be increased such that the reaction mixture is neutralized or made basic to terminate the condensation or polymerization. The pH required to terminate the condensation or polymerization can vary and can be determined, at least in part, by the particular composition of the intermediate amine-aldehyde reaction product. For example, when the intermediate amine-aldehyde reaction product comprises a urea-formaldehyde resin and the first amine compound comprises urea, the condensation or polymerization of the reaction mixture can be terminated or substantially terminated by increasing the pH thereof to about 7 or greater. In another example, when then intermediate amine-aldehyde reaction product comprises a melamine-urea-formaldehyde resin and the first amine compound comprises urea, the condensation or polymerization of the reaction mixture can be terminated or substantially terminated by increasing the pH thereof to about 8.5 or greater. The pH of the intermediate amine-aldehyde reaction product can be adjusted to about 7 or greater to terminate or substantially terminate the condensation or polymerization. For example, the pH of the intermediate amine-aldehyde reaction product can be adjusted to a low of about 7, about 7.1, about 7.2, about 7.3, about 7.4, about 7.5, about 7.6, about 7.7, about 7.8, about 7.9, or about 8 to a high of about 8.1, about 8.2, about 8.3, about 8.4, about 8.5, about 8.6, about 8.7, about 8.8, about 8.9, about 9, about 9.5, about 10, about 10.5, about 11, about 11.5, about 12, about 12.5, about 13, about 13.5, or greater to terminate or substantially terminate the condensation or polymerization. In another example, the pH of the intermediate amine-aldehyde reaction product can be adjusted to about 7 to about 8, about 7.1 to about 7.9, about 7.2 to about 7.8, about 7.3 to about 7.7, or about 7.4 to about 7.6 to terminate or substantially terminate the condensation or polymerization. In another example, the pH of the intermediate amine-aldehyde reaction product can be adjusted to about 8 to about 9, about 8.1 to about 9.9, about 8.2 to about 9.8, about 8.3 to about 9.7, or about 8.4 to about 9.6 to terminate or substantially terminate the condensation or polymerization.

In another example, the pH can be increased such that the reaction product remains acidic to slow or decrease the rate of the condensation or polymerization. The pH required to decrease the rate of the condensation or polymerization can vary and can be determined, at least in part, by the particular composition of the intermediate amine-aldehyde reaction product. For example, the rate of condensation or polymerization of the reaction mixture can be decreased by increasing the pH thereof, such as about 6 to about 7. In another example, the rate of condensation or polymerization of the reaction mixture can be decreased by increasing the pH thereof from a low of about 6, about 6.1, about 6.2, about 6.3, about 6.4, or about 6.5 to a high of about 6.6, about 6.7, about 6.8, about 6.9, or about 7. In another example, the rate of condensation or polymerization of the reaction mixture can be decreased by increasing the pH thereof, such as about 6 to about 7, about 6.1 to about 6.9, about 6.2 to about 6.8, about 6.3 to about 6.7, or about 6.4 to about 6.6.

The intermediate amine-aldehyde reaction product can be free of or substantially free of any catalysts or accelerators when the first amine compound is added thereto to produce the amine-aldehyde resin or binder. As such, the amine-aldehyde resin can also be free of or substantially free of any catalysts or accelerators. As used herein, the terms "substantially free of" and "free of" refer to an intermediate amine-aldehyde reaction product and an amine-aldehyde resin to which no catalyst or accelerator is intentionally added. As used herein, the terms "catalyst" and "accelerator" are used interchangeably and refer to any compound(s) or substance(s) that can intentionally be added to the amine-aldehyde resin in order to increase curing thereof.

Preparation of Amine-Aldehyde Resin

The first amine compound can be added to the intermediate amine-aldehyde reaction product to produce the amine-aldehyde resin. Any one or more of the amine compounds can include one or more compounds. For example, the first, second, and/or third amine compounds can be or include one or more amine compounds previously discussed and described (e.g., urea, melamine, or any combination thereof).

The first amine compound and the intermediate amine-aldehyde reaction product can be combined with one another to provide a total aldehyde compound to total amine compound molar ratio of about 1.5:1 to about 1.7:1. For example, the first amine compound and the intermediate amine-aldehyde reaction product can be combined with one another to provide a total aldehyde compound to total amine compound molar ratio of a low of about 1.5:1, about 1.51:1, about 1.52:1, about 1.53:1, about 1.54:1, about 1.55:1, about 1.56:1, about 1:57:1, about 1.58:1, about 1.59:1, or about 1.6:1 to a high of about 1.62:1, about 1.63:1, about 1.64:1, about 1.65:1, about 1.66:1, about 1.67:1, about 1.68:1, about 1.69:1, about 1.7:1, or about 1.71:1. In another example, the amine-aldehyde resin can have a total aldehyde compound to total amine compound molar ratio of about 1.5:1 to about 1.7:1, about 1.52:1 to about 1.68:1, about 1.54:1 to about 1.66:1, about 1.56:1 to about 1.64:1, or about 1.58:1 to about 1.62:1. In another example, the amine-aldehyde resin can have total aldehyde compound to total amine compound molar ratio of about 1.5:1 to less than 1.7:1, about 1.52:1 to less than 1.68:1, about 1.54:1 to less than 1.66:1, about 1.56:1 to less than 1.64:1, or about 1.58:1 to less than 1.62:1. In another example, the amine-aldehyde resin can have a total aldehyde compound to total amine compound molar ratio of greater than 1.5:1 to about 1.7:1, greater than 1.52:1 to about 1.68:1, greater than 1.54:1 to about 1.66:1, greater than 1.56:1 to about 1.64:1, or greater than 1.58:1 to about 1.62:1.

The first amine compound and the intermediate amine-aldehyde reaction product can be reacted to provide the amine-aldehyde resin having a desired viscosity. The first amine compound and the intermediate amine-aldehyde reaction product can be reacted to provide the amine-aldehyde resin having a viscosity of about 800 centipoise ("cP") to about 1,200 cP at a temperature of 25° C. For example, the first amine compound and the intermediate amine-aldehyde reaction product can be reacted to provide the amine-aldehyde resin having a viscosity from a low of about 800 cP, about 850 cP, about 900 cP, about 950 cP, or about 1,000 cP to a high of about 1,050 cP, about 1,100 cP, about 1,150 cP, or about 1,200 cP at a temperature of 25° C. In another example, the first amine compound and the intermediate amine-aldehyde reaction product can be reacted to provide the amine-aldehyde resin having a viscosity of about 800 cP to about 1,200 cP, about 850 cP to about 1,150 cP, about 900 cP to about 1,100 cP, about 950 cP, to about 1,050 cP, about 1,000 cP to about 1,050 cP at a temperature of 25° C. In another example, the first amine compound and the intermediate amine-aldehyde reaction product can be reacted to provide the amine-aldehyde resin having a viscosity, when measured by Garner-Holdt method at a temperature of 25° C., of about W.

The first amine compound and the intermediate amine-aldehyde reaction product can be reacted to provide the amine-aldehyde resin having a desired water tolerance. For example, the amine-aldehyde resin can be diluted to a concentration from a low of about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, about 15 wt %, or about 20 wt % to a high of about 25 wt %, about 30 wt %, about 35 wt %, about 40 wt %, or about 50 wt %, based on the total weight of the amine-aldehyde resin and the water, before the solution becomes turbid. In another example, the amine-aldehyde resin can be diluted to a concentration from a low of about 20 wt %, about 21 wt %, about 22 wt %, about 23 wt %, about 24 wt %, about 25 wt %, about 26 wt %, about 27 wt %, about 28 wt %, about 29 wt %, or about 30 wt % to a high of about 31 wt %, about 32 wt %, about 33 wt %, about 34 wt %, about 35 wt %, about 36 wt %, about 37 wt %, about 38 wt %, about 39 wt %, or about 40 wt %, based on the total weight of the amine-aldehyde resin and the water, before the solution becomes turbid.

The first amine compound and the intermediate amine-aldehyde reaction product can be reacted at any desired temperature or range of temperatures to provide the amine-aldehyde resin. For example, the first amine compound and the intermediate amine-aldehyde reaction product can be reacted at a temperature of about room temperature (e.g., 25° C.) to about 100° C. In another example, the first amine compound and the intermediate amine-aldehyde reaction product can be reacted at a temperature from a low of about 50° C., about 55° C., about 60° C., about 65° C., about 70° C., about 72° C., about 74° C., about 76° C., about 78° C., or about 80° C. to a high of about 82° C., about 84° C., about 86° C., about 88° C., about 90° C., about 92° C., about 94° C., about 96° C., about 98° C., or about 100° C. In another example, the first amine compound and the intermediate amine-aldehyde reaction product can be reacted at a temperature of about 70° C. to about 90° C., about 72° C. to about 88° C., about 74° C. to about 86° C., about 76° C. to about 84° C., or about 78° C. to about 82° C.

The first amine compound and the intermediate amine-aldehyde reaction product can be reacted or carried out for any desired length or amount of time. For example, the reaction can be carried out for a time from a low of about 30 minutes, about 45 minutes, or about 1 hour to a high of about 2 hours, about 3 hours, about 4 hours, or about 5 hours. The reaction time of the first amine compound and the intermediate amine-aldehyde reaction product can depend, at least in part, on the desired properties (e.g., water tolerance and/or viscosity) of the intermediate amine-aldehyde reaction product. The reaction time of the first amine compound and the intermediate amine-aldehyde reaction product can also depend, at least in part, on the reaction temperature and/or the pH of the first intermediate product.

When the reaction between the first amine compound and the intermediate amine-aldehyde reaction product has been completed or the desired properties are achieved, the pH of can be increased. Increasing the pH can substantially terminate or terminate the condensation or polymerization of the reaction product, thereby providing the amine-aldehyde resin. For example, the pH can be increased such that the reaction product is neutralized or made basic to terminate the condensation or polymerization. The pH that can substantially terminate or terminate the condensation or polymerization can vary and can be determined, at least in part, by the particular composition of the amine-aldehyde resin. For example, when the amine-aldehyde resin includes a urea-formaldehyde resin and the first amine compound includes urea, the condensation or polymerization of the reaction mixture can be terminated or substantially terminated by increasing the pH thereof to about 7 or greater. In another example, when then amine-aldehyde resin includes a melamine-urea-formaldehyde resin and the first amine compound comprises urea, the condensation or polymerization of the reaction mixture can be terminated or substantially terminated by increasing the pH thereof to about 8.5 or greater. The pH of the amine-aldehyde resin can be adjusted to about 7 or greater to terminate or substantially terminate the condensation or polymerization. For example, the pH of the amine-aldehyde resin can be adjusted from a low of about 6, about 6.1, about 6.2, about 6.3, about 6.4, about 6.5, about 6.6, about 6.7, about 6.8, about 6.9, or about 7 to a high of about 7.1, about 7.2, about 7.3, about 7.4, about 7.5, about 7.6, about 7.7, about 7.8, about 7.9, about 8, about 8.5, about 9, about 9.5, about 10, about 10.5, about 11, about 11.5, about 12, about 12.5, or greater to terminate or substantially terminate the condensation or polymerization. In another example, the pH of the amine-aldehyde resin can be adjusted to about 6 to about 8, about 6.1 to about 7.9, about 6.2 to about 7.8, about 6.3 to about 7.7, or about 6.4 to about 7.6 to terminate or substantially terminate the condensation or polymerization. In another example, the pH of the amine-aldehyde resin can be adjusted to about 7 to about 8, about 7.1 to about 8.9, about 7.2 to about 8.8, about 7.3 to about 8.7, or about 7.4 to about 8.6 to terminate or substantially terminate the condensation or polymerization.

The amine-aldehyde resins can have a non-volatiles or solids content of about 30% to about 75%. For example, the amine-aldehyde resin can include non-volatiles in an amount from a low of about 30%, about 32%, about 34%, about 36%, about 38%, about 40%, about 42%, about 44%, about 46%, about 48%, or about 50% to a high of about 52%, about 54%, about 56%, about 58%, about 60%, about 62%, about 64%, about 66%, about 68%, about 70%, about 72%, about 74%, about 76%, about 78%, or about 80%. In another example, the amine-aldehyde resin can include non-volatiles in an amount of about 30% to about 80%, about 32% to about 78%, about 34% to about 76%, about 36% to about 74%, about 34% to about 72%, about 32% to about 70%, about 34% to about 68%, about 36% to about 66%, about 38% to about 64%, about 40% to about 62%, about 42% to about 60%, about 44% to about 58%, about 46% to about 60%, about 48% to about 58%, or about 50% to about 56%.

The amine-aldehyde resin can have a weight average molecular weight (Mw) from a low of about 200, about 400, about 600, about 800, about 1,000, about 1,200, about 1,400, about 1,600, about 1,800, about 2,000, about 2,200, about 2,400, about 2,600, about 2,800, or about 3,000 to a high of about 3,200, about 3,400, about 3,600, about 3,800, about 4,000, about 4,200, about 4,400, about 4,600, about 4,800, about 5,000, about 5,200, about 5,400, about 5,600, about 5,800, or about 6,000. In another example, the amine-aldehyde resin can have a weight average molecular weight of about 200 to about 6,000, about 400 to about 5,800, about 600 to about 5,600, about 800 to about 5,400, about 1,000 to about 5,200, about 1,200 to about 5,000, about 1,400 to about 4,800, about 1,600 to about 4,600, about 1,800 to about 4,400, about 2,000 to about 4,200, about 2,200 to about 4,000, about 2,400 to about 3,800, about 2,600 to about 3,600, about 2,800 to about 3,400, or about 3,000 to about 3,200.

The amine-aldehyde resin can be used in the production of one or more lignocellulose composite products, stored on site for future use, transported to another location and stored and/or used in the production of one or more lignocellulose composite products, or any combination thereof. The amine-aldehyde resin can have a shelf life of about 1 day or more, about 2 days or more, about 3 days or more, about 4 days or more, about 5 days or more, about 6 days or more, about one week or more, about two weeks or more, about 3 weeks or more, or about 4 weeks or more. In other words, the amine-aldehyde resin produced by mixing the intermediate amine-aldehyde reaction product with the first amine compound and the first aldehyde compound can be a stable product having a shelf life ranging from a day, several days, or a month, to more than a month.

One or more catalysts or accelerators can be mixed, blended, or otherwise combined with the amine-aldehyde resin to provide or produce a catalyst/accelerator containing amine-aldehyde resin. Catalysts that can be combined with the amine-aldehyde resin can include, but are not limited to, one or more metal salts. Illustrative metal salts can include, but are not limited to, salts of sodium, potassium, aluminum, magnesium, zinc, any combination thereof, or any mixture thereof. For example, the catalyst can be or include sodium nitrate, aluminum sulfate, ammonium hydrogen phosphate, ammonium persulfate, ammonium chloride, ammonium sulfate, ammonium nitrate, any combination thereof, or any mixture thereof.

The amount of the catalyst combined or otherwise added with the amine-aldehyde resin can be about 0.1 wt % to about 15 wt %, based on the total weight of the amine-aldehyde resin and the catalyst. For example, the amount of the catalyst combined with the amine-aldehyde resin can be from a low of about 0.3 wt %, about 0.5 wt %, or about 1 wt % to a high of about 3 wt %, about 5 wt %, about 7 wt %, about 9 wt %, about 11 wt %, or about 13 wt %, based on the total weight of the amine-aldehyde resin and the catalyst.

One or more additional aldehyde compounds or "second aldehyde compounds" can be mixed, blended, or otherwise combined with the amine-aldehyde resin. The amount of the second aldehyde compound added to the amine-aldehyde resin can be about 1 wt % to about 50 wt %, based on the total weight of the aldehyde compound(s) in the amine-aldehyde resin. For example, the amount of the second aldehyde compound added to the amine-aldehyde resin can be from a low of about 1 wt %, about 2 wt %, about 3 wt %, about 4 wt %, or about 5 wt % to a high of 10 wt %, about 15 wt %, about 20 wt %, about 25 wt %, or about 30 wt %, based on the total weight of the aldehyde compound(s) in the amine-aldehyde resin. The addition of the second aldehyde compound to the amine-aldehyde resin can be as discussed and described in U.S. Pat. No. 6,881,817.

One or more additives can also be mixed, blended, or otherwise combined with the amine-aldehyde resin. Illustrative additives can include, but are not limited to, waxes or other hydrophobic additives, water, filler material(s), extenders, surfactants, release agents, dyes, fire retardants, formaldehyde scavengers, and the like. For cellulose containing lignocellulose composite products, such as plywood, illustrative filler material(s) can include, but are not limited to, ground pecan and/or walnut shells. Illustrative extenders can include, but are not limited to, wheat flour. The amine-aldehyde resins can also include additives such as ammonia, alkanolamines, or polyamines, such as an alkyl primary diamine, e.g., ethylenediamine (EDA). Other additives, such as melamine, ethylene ureas, and primary, secondary and tertiary amines, for example, dicyanodiamide, can also be incorporated into the amine-aldehyde resins. Concentrations of these additives in the reaction mixture often can vary about 0.05 to about 20% by weight of the amine-aldehyde resins solids. These types of additives can promote hydrolysis resistance, polymer flexibility and lower formaldehyde emissions in the cured resin. Further urea additions for purposes of scavenging formaldehyde or as a diluent can also be used.

The amine-aldehyde resin can be modified by the post addition of caustic and/or other additives such as urea and/or ammonia, which can be added to reduce the residual level of free, unreacted formaldehyde in the synthesized resin. Other additives can include, but are not limited to, dispersants, biocides, viscosity modifiers, pH adjusters, coupling agents, lubricants, defoamers, and the like.

The amine-aldehyde resin can be used as a modifier for one or more resin systems. The amine-aldehyde resin can be used to modify a resin system by reacting the amine-aldehyde resin into the resin system, blending the amine-aldehyde resin with the resin system, blending into a particulate binder composition, or any combination thereof. For example, the amine-aldehyde resin can be used to modify a urea-formaldehyde resin, a melamine-formaldehyde resin, a melamine-urea-formaldehyde resin, or any combination thereof.

Particulate Binder Composition

The particulate binder composition including the amine-aldehyde resin and having an increased flow or fusion diameter can be produced by any suitable process or combination of processes. Illustrative processes for producing the particulate binder composition can include, but are not limited to, spray-drying, freeze drying, vacuum drying, precipitation, air drying, and/or dry spinning. For example, the amine-aldehyde resins can be spray-dried to provide the particulate binder composition. The amine-aldehyde resin can be mixed, blended, or otherwise combined with a liquid medium to produce a liquid mixture. One or more additives can be mixed, blended, or otherwise combined with the amine-aldehyde resins, the liquid medium, and/or the liquid mixture. The liquid mixture can be processed, e.g., spray-dried, to produce the particulate binder composition, where each particulate includes the amine-aldehyde resin having an increased fusion diameter. Producing the particulate binder composition can provide a free-flowing powder that is easily handled.

Spray drying refers to the process of producing a dry particulate solid product or particulate binder composition from the liquid mixture. The process can include spraying or atomizing the liquid mixture, e.g., forming small droplets, into a temperature controlled gas stream to evaporate the liquid from the atomized droplets and produce the particulate binder composition. For example, in the spray drying process, the liquid mixture of the amine-aldehyde resin and, optionally, the one or more additives, can be atomized to small droplets and mixed with hot air to evaporate the liquid from the droplets. The temperature of the liquid mixture during the spray-drying process can usually be close to or greater than the boiling temperature of the liquid. An outlet air temperature of about 60° C. to about 120° C. can be common. Due to the curable (thermosetting) character of the amine-aldehyde resin, adjusting the operation of the spray-drying process to achieve thorough evaporation of the liquid at the lowest possible inlet and outlet temperatures can generally be desired.

The liquid mixture can have an aeration level or a gas volume fraction (GVF). The GVF can be provided by the agitation of the liquid mixture containing the amine-aldehyde resin and/or, optionally, one or more additives (e.g., surfactant). In addition to, or in substitution of agitating the liquid mixture, air or another suitable gas or combination of gases can be injected into the liquid mixture to increase the aeration level or GVF thereof. The liquid mixture to be spray-dried can have a GVF of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, or greater than 20%, based on the liquid volume of the de-aerated liquid mixture. In another example, the liquid mixture to be spray-dried can have a GVF from a low of about 1 wt %, about 3 wt %, about 5 wt %, or about 7 wt % to a high of about 13 w %, about 15 wt %, about 17 wt %, or about 19 wt %. The GVF of a liquid mixture can be determined by comparing a change in the observed aerated density and the actual de-aerated density of the liquid mixture. In another example, the liquid mixture to be spray-dried can have a GVF of no greater than 100%, no greater than 90%, no greater than 80%, no greater than 70%, no greater than 60%, no greater than 50%, no greater than 45%, no greater than 40%, no greater than 35%, no greater than 30%, no greater than 25%, no greater than 20%, no greater than 15%, or no greater than 10% based on the liquid volume of the de-aerated liquid resole resin. Any suitable technique for determining or monitoring the GVF of the liquid mixture to be spray-dried can be used. Suitable techniques can include, but are not limited to those discussed and described in U.S. Pat. Nos. 7,343,818 and 7,596,987. As recognized by one skilled in the art, the level of aeration of a liquid (GVF) also can be assessed by comparing the difference between the observed aerated density and the actual de-aerated density of the liquid.

The average particle size and/or distribution, liquid (e.g., water) concentration, packed bulk density, or any combination thereof, of the particulate binder composition prepared via spray drying can be controlled, adjusted, or otherwise influenced by one or more operating conditions and/or parameters of the spray dryer. Illustrative operating conditions can include, but are not limited to, the rate and temperature of the gas stream, a feed rate of the liquid mixture via the atomizer, a temperature of the liquid mixture, and the size and/or solids concentration of the droplets, or any combination thereof. The particle size and/or distribution, liquid (e.g., water) concentration, packed bulk density, or any combination thereof, of the particulate binder composition prepared via spray drying can also be determined by one or more characteristics or variables of the liquid mixture. Illustrative variables can include, but are not limited to, the resin solids concentration of the liquid mixture, surface tension of the liquid mixture, or any combination thereof. The particle size and/or distribution of the particulate binder composition can be reduced by additional mechanical grinding. The average particle size can be determined according to the Structural Board Association (SBA) GPAM2771.3 test procedure.

The liquid mixture can be atomized with one or more pressure nozzles (e.g., fluid nozzle atomizer), one or more pulse atomizers, or one or more high speed spinning discs (e.g., centrifugal or rotary atomizer). Despite the high velocity generation of droplets, the spray dryer can be designed to minimize contact between the droplets and one or more surfaces of the spray dryer. This effect can be achieved by optimizing one or more operating conditions and/or parameters of the spray dryer previously discussed. Illustrative operating conditions can further include, but are not limited to, atomizer velocity, rate and/or temperature of the gas stream, spray dryer dimensions (e.g., height, width, length, and/or diameter), and a design and/or temperature of an inlet and/or outlet to produce the gas stream flow (e.g., cyclonic gas flow in the chamber).

The particulate binder composition can have a liquid concentration from a low of about 0.5 wt %, about 1 wt %, about 1.5 wt %, about 2 wt %, about 3 wt %, about 4 wt %, about 5 wt % to a high of about 6 wt %, about 7 wt %, about 8 wt %, about 9 wt %, or about 10 wt %. For example, the liquid concentration of the particulate binder composition can be about 0.05 wt % to about 10 wt %, about 1 wt % to about 9 wt %, about 1.5 wt % to about 8 wt %, about 2 wt % to about 7 wt %, about 3 wt % to about 6 wt %, or about 4 wt % to about 6 wt %. The liquid (e.g., water) concentration of the particulate binder composition can be less than 20 wt %, less than 15 wt %, less than 10 wt %, less than 8 wt %, less than 6 wt %, less than 4 wt %, less than 3 wt %, less than 2 wt %, less than 1 wt %. less than 0.7 wt %, less than 0.5 wt %, less than 0.3 wt %, less than 0.1 wt %, less than 0.05 wt %, or less than 0.01 wt %.

The particulate binder composition can have an average particle size of about 0.1 µm to about 150 µm. For example, the average particle size of the particulate binder composition can be from a low of about 0.1 µm, about 0.5 µm, about 1 µm, about 5 µm, about 10 µm, or about 20 µm to a high of about 50 µm, about 75 µm, about 100 µm, about 125 µm, or about 150 µm. In another example, the particulate binder composition can have an average particle size from a low of about 0.1 µm, about 0.5 µm, about 1 µm, about 2 µm, about 3 µm, or about 5 µm to a high of about 20 µm, about 25 µm, about 30 µm, about 35 µm, about 40 µm, about 45 µm, or about 50 µm. In another example, the average particle size of the particulate binder composition can be about 3 µm to about 90 µm, about 10 µm to about 80 µm, about 20 µm to about 70 µm, about 35 µm to about 75 µm, about 40 µm to about 65 µm, about 1 µm to about 20 µm, about 3 µm to about 30 µm, about 10 µm to about 20 µm, about 5 µm to about 40 µm, or about 5 µm to about 35 µm. In another example, about 80 wt % to about 90 wt % of the particulate binder composition can have an average particle size of less than 100 μm, less than 85 μm, or less than 75 μm. In another example, about 60 wt % to about 70 wt % of the particulate binder composition can have an average particle size of less than 60 μm, less than 50 μm, or less than 45 μm.

Each particulate of the particulate binder composition can include about 1 to about 100 individual or discrete particles of the one or more additives. For example, the number of discrete particles of additives distributed throughout the particulate binder composition can be from a low of about 1, about 2, about 3, about 4, about 5, about 6, about 7, about 8, or about 9 to a high of about 10, about 15, about 20, about 30, about 40, about 50, about 60, about 70, about 80, about 90, or about 100. In another example, the number of discrete particles of the additives distributed throughout the binder composition can be about 1 to about 2, about 1 to about 3, about 1 to about 4, about 1 to about 5, about 2 to about 10, about 3 to about 6, about 1 to about 15, or about 4 to about 12. Alternatively, each individual particulate of the particulate binder composition can be or include either the amine-aldehyde resin or the additives. Said another way, the particulate binder composition can be or include a mixture of discrete particulates composed of the amine-aldehyde resin where the additives are not included in the individual particulates composed of the amine-aldehyde resin, and discrete particulates composed of the additives. In another alternative embodiment, each particulate of the particulate binder composition can be free from any additives.

The individual particulates of the particulate binder composition can have the same or different composition throughout. For example, any one or more of the particulates of the particulate binder composition can have the same composition throughout that particulate. Said another way, the composition of the particulates can include the amine-aldehyde resin and/or the additives dispersed throughout a body of the particulate. The individual particulates of the particulate binder composition can also have a different composition with respect to one another. For example, a first plurality or group of particulates of the particulate binder composition can be composed of the amine-aldehyde resin without the presence of additives therein and a second plurality or group of particulates of the particulate binder composition can be composed of the additives without the presence of the amine-aldehyde resin therein.

When the individual particulates of the particulate binder composition include both the amine-aldehyde resin and the additives, the concentration of the additives in each individual particulate of the particulate binder composition can be the same or different with respect to another individual particulate. The concentration of the additives in the particulates of the binder composition can be from about 0.5 wt % to about 30 wt %, based on the total weight of the amine-aldehyde resin solids and the additives. For example, the concentration of the additives in the individual particulates of the particulate binder composition can be from a low of about 1 wt %, about 3 wt %, about 5 wt %, about 7 wt %, or about 9 wt % to a high of about 14 wt %, about 16 wt %, about 18 wt %, about 20 wt %, about 22 wt %, about 24 wt %, or about 26 wt %, based on the total weight of the amine-aldehyde resin solids and the fillers and/or extenders. In another example, the amount of the additives in the particulates of the binder composition can be about 2 wt % to about 7 wt %, about 4 wt % to about 12 wt %, about 8 wt % to about 17 wt %, about 10 wt % to about 22 wt %, or about 4 wt % to about 16 wt %, based on the total weight of the amine-aldehyde resin solids and the additives.

The particulate binder composition can include a mixture of a first particulate binder composition containing a first amine-aldehyde resin and/or, optionally, the additives and an additional or "second" particulate binder composition containing a second amine-aldehyde resin and/or, optionally, the additives. The first amine-aldehyde resin and the second amine-aldehyde resin can be the same or different. For example, both the first and second amine-aldehyde resins can be a urea-formaldehyde resin. In another example, either the first amine-aldehyde resin or the second amine-aldehyde resin can be a melamine-formaldehyde resin and the other can be a urea-formaldehyde resin. The particulate binder composition can include a mixture of a first particulate binder composition containing a first amine-aldehyde resin and a first additive and a second particulate binder composition containing a second amine-aldehyde resin and a second additive. The first additive and the second additive can be the same or different.

The particulate binder composition can have a packed bulk density of about 0.15 g/cm$^3$ to about 0.85 g/cm$^3$. For example, the packed bulk density of the particulate binder composition can range from a low of about 0.15 g/cm$^3$, about 0.3 g/cm$^3$, about 0.35 g/cm$^3$, about 0.4 g/cm$^3$, or about 0.45 g/cm$^3$ to a high of about 0.6 g/cm$^3$, about 0.65 g/cm$^3$, about 0.7 g/cm$^3$, about 0.75 g/cm$^3$, about 0.8 g/cm$^3$, or about 0.85 g/cm$^3$. In another example, the particulate binder composition can have a packed bulk density of about 0.45 g/cm$^3$ to about 0.57 g/cm$^3$, about 0.4 g/cm$^3$ to about 0.6 g/cm$^3$, about 0.55 g/cm$^3$ to about 0.75 g/cm$^3$, or about 0.35 g/cm$^3$ to about 0.65 g/cm$^3$. In another example, the particulate binder composition can have a packed bulk density of less than 0.68 g/cm$^3$, less than 0.6 g/cm$^3$, less than 0.58 g/cm$^3$, or less than 0.57 g/cm$^3$. The packed bulk density can be determined according to the Structural Board Association (SBA) GPAM2771.4 test procedure.

The spray-dried material or particulate binder composition can be a free-flowing powder that is easily handled. Generally, at least 90 wt % of the particulate binder composition can pass through a 200 mesh screen (U.S. Standard Screen Series). In other words, at least 90 wt % of the particles can be smaller than 74 microns. Usually, at least about 70 wt % to about 90 wt % of the particles can be greater than 10 microns. If necessary, the particulate binder composition can be subjected to additional mechanical grinding.

The particulate binder composition can have a stroke cure time from a low of about 1 second, about 3 seconds, about 5 seconds, about 10 seconds, about 15 seconds, or about 20 seconds to a high of about 25 seconds, about 30 seconds, about 35 seconds, about 40 seconds, about 45 seconds, or about 50 seconds. For example, the particulate binder composition can have a stroke cure time of about 5 seconds to about 40 seconds, about 10 seconds to about 35 seconds, about 15 seconds to about 30 seconds, about 20 seconds to about 25 seconds, about 25 seconds to about 45 seconds, or about 30 seconds to about 45 seconds. In another example, the particulate binder composition can have a stroke cure time of at least 1 second, at least 3 seconds, at least 5 seconds, at least 10 seconds, at least 15 seconds, at least 20 seconds, at least 25 seconds, at least 27 seconds, at least 28 seconds, at least 29 seconds, at least 30 seconds, at least 31 seconds, at least 32 seconds, at least 33 seconds, at least 34 seconds, at least 35 seconds, at least 36 seconds, at least 37 seconds, or at least 38 seconds and up to about 40 seconds, about 42 seconds, about 44 seconds, about 46 seconds, about 48 seconds, or about 50 seconds. The stroke cure time can be measured and determined according to the test procedure provided for in ASTM D4640-86. The stroke cure time can also be determined according to the Structural Board Association (SBA) GPAM2771.1 test procedure.

The particulate binder compositions discussed and described herein can be reconstituted with water or other liquid medium to form a liquid adhesive for making these and other wood composite products. For example, the particulate binder compositions can be reconstituted with a liquid medium to have a solids content ranging from a low of about 5 wt %, about 10 wt %, about 15 wt %, or about 20 wt % to a high of about 40 wt %, about 50 wt %, about 60 wt %, about 70 wt %, or about 80 wt %, based on the total weight of the amine-aldehyde resin, the filler and/or extender, and the liquid medium.

The particulate binder compositions can have a moisture content of less than 10 wt %, less than 8 wt %, less than 6 wt %, less than 4 wt %, less than 3 wt %, less than 2 wt %, less than 1 wt %. less than 0.7 wt %, less than 0.5 wt %, less than 0.3 wt %, less than 0.1 wt %, less than 0.05 wt %, or less than 0.01 wt %. For example, the moisture (or other liquid) content of the spray-dried powder or the particulate binder composition can be less than 6 wt %, less than 5.5 wt % or less than 5 wt % or less than 4.5 wt %, or less than 3.5 wt %, or less than 2.5 wt %, or less than 1.5 wt %, or less than 0.5 wt %.

One or more additional additives or modifiers can be combined with the particulate binder composition and/or the liquid mixture of the amine-aldehyde resin and the additives and/or any one or more of the liquid amine-aldehyde resin and the additives when the particulate binder composition includes a mixture of discrete amine-aldehyde resin particulates and discrete additive particulates. Illustrative additional additives or modifiers can include, but are not limited to, catalysts, other cure promoters or accelerants (e.g., alkali metal and alkaline earth metal carbonates and hydroxides, such as sodium hydroxide), thickeners, adduct-forming agents (e.g., urea), tack promoters (e.g., borax), foaming agents, defoamers, and/or surfactants. For example, one or more surfactants, such as nonionic surfactants, can be combined with the liquid mixture of the amine-aldehyde resin and the additives to adjust or control a packed bulk density of the spray-dried particulate binder composition, as discussed and described in U.S. Patent Application Publication No. 2011/0136947.

Production of Lignocellulosic Products

The particulate binder composition containing the amine-aldehyde resin (e.g., the spray-dried amine-aldehyde resin) and/or the amine-aldehyde resin alone can be used to make, produce, or otherwise prepare a variety of products (e.g., lignocellulose composite products). The products can be a composite made from a plurality of substrates or particulates bound to one another with the particulate binder composition.

The plurality of substrates can be derived from any number of starting materials or combination of starting materials. Starting materials from which the substrates can be derived can include, but are not limited to, glass, carbon, lignocellulose, polymers, gypsum, metal, cement, or any mixture or combination thereof. The starting material, from which the substrates can be derived, can be shaped, reduced, or otherwise formed to the appropriate dimensions by various processes such as hogging, grinding, hammer milling, tearing, shredding, and/or flaking. Other processes for producing the substrates can include skiving, cutting, slicing, and/or sawing.

In at least one example, the substrate can be a lignocellulose substrate and the composite product is a lignocellulose composite product. Specific lignocellulose composite products can include engineered products, e.g., engineered wood products. Engineered wood products can include a plurality of substrates composed of wood and/or other lignocellulose materials and one or more adhesives to bind, couple, bond, affix, or otherwise join the plurality of substrates to one another to form the engineered product. Illustrative engineered wood products can include, but are not limited to, particleboard, fiberboard such as medium density fiberboard ("MDF") and/or high density fiberboard ("HDF"), waferboard, oriented strand board plywood ("OSB"), plywood, laminated veneer lumber ("LVL"), laminated veneer boards ("LVB"), engineered wood flooring, and the like. Any suitable adhesive (e.g., particulate binder composition including amine-aldehyde resin) can be used to bind or join the substrates to one another.

Suitable forms of the lignocellulose substrates can include, but are not limited to, particles, chips, flakes, wafers, fibers, powders, shavings, strands, sawdust or dust, veneers, strands, and/or the like. The lignocellulose substrates can have a length from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm.

The lignocellulose substrates (e.g., materials that include both cellulose and lignin) can include, but are not limited to, straw, hemp, sisal, cotton stalk, wheat, bamboo, sabai grass, rice straw, banana leaves, paper mulberry (e.g., bast fiber), abaca leaves, pineapple leaves, esparto grass leaves, fibers from the genus Hesperaloe in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, animal fibers (e.g., wool, hair), recycled paper products (e.g., newspapers, cardboard, cereal boxes, and magazines), or any combination thereof. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow. The lignocellulose substrates can have a moisture concentration ranging from about 1 wt % to about 25 wt %. For example, the lignocellulose substrates can have a moisture concentration ranging from a low of about 2 wt %, about 3 wt %, about 4 wt %, or about 5 wt % to a high of about 10 wt %, about 13 wt %, about 16 wt %, or about 19 wt %, or about 22 wt %.

As used herein, the terms "curing," "cured," "at least partially curing," "at least partially cured," and similar terms are intended to refer to the structural and/or morphological change that occurs in the mixture, such as by covalent chemical reaction (crosslinking), ionic interaction or clustering, phase transformation or inversion, and/or hydrogen bonding when the is subjected to conditions sufficient, e.g., sufficiently heated, to cause the properties of a flexible, porous substrate, such as a nonwoven mat or blanket of lignocellulose substrates and/or a rigid or semi-rigid substrate, such as a wood or other lignocellulose containing board or sheet, to which the amine-aldehyde resin has been applied, to be altered.

The particulate binder composition can be applied to a plurality of wood or lignocellulose substrates to form a mixture of the particulate binder composition and the lignocellulose substrate. The mixture can also be referred to as a "furnish," "blended furnish," "resinated mixture," and "resinated furnish." The mixture can be heated to produce a composite lignocellulose product or "composite product." The lignocellulose substrates can be formed into a desired shape before, during, and/or after application of the particulate binder composition, and the particulate binder composition can be at least partially cured to produce a composite product. At least partially curing the particulate binder composition can include applying heat and/or pressure thereto. In another example, the particulate binder composition can be applied to a plurality of lignocellulose particles and at least partially cured to produce wood based products or composites. In another example, the particulate binder composition can be applied to lignocellulose based veneers and/or substrates and the binder composition can be at least partially cured to adhere the veneer(s) and/or substrate(s) to one another. In another example, the particulate binder composition can be applied to a plurality of randomly oriented or non-oriented lignocellulose substrates, e.g., fibers, chips, flakes, strands, or the like, or any combination thereof, formed into a mat or board shape, and then at least partially cured to produce a lignocellulose mat or board. In another example, the particulate binder composition can be applied to a plurality of oriented lignocellulose fibers, chips, flakes, strands, or the like, or any combination thereof, formed into a mat or board shape, and then at least partially cured to produce a lignocellulose mat or board. For example, the mat or board shape can include two or more layers of the lignocellulose substrates with each layer have substantially aligned lignocellulose substrates and with the lignocellulose substrates in each adjacent layer oriented perpendicularly to the one another.

The amount of the particulate binder composition applied to the lignocellulose substrates can range from a low of about 1 wt %, about 2 wt %, about 3 wt %, about 4 wt %, about 5 wt % or about 6 wt % to a high of about 10 wt %, about 12 wt %, about 15 wt %, or about 20 wt %, based on the dry weight of the lignocellulose substrates. For example, a composite product of the lignocellulose substrates can include about 5 wt % to about 15 wt %, about 8 wt % to about 14 wt %, about 10 wt % to about 12 wt %, or about 7 wt % to about 10 wt % binder composition, based on the dry weight of the lignocellulose substrates. In another example, a composite product of the lignocellulose substrates can contain from about 1 wt % to about 4 wt %, about 1.5 wt % to about 5 wt %, about 2 wt % to about 4 wt %, about 2 wt % to about 6 wt %, or about 0.5 wt % to about 5.5 wt % binder composition, based on the dry weight of the lignocellulose substrates.

Methods for using the particulate binder composition for making composite products can include contacting and/or mixing a plurality of substrates to at least partially coat and/or mix the substrates with the particulate binder composition. The substrates can be contacted with the particulate binder composition by spraying, coating, mixing, brushing, falling film or curtain coater, dipping, soaking, or the like. The plurality of substrates contacted and/or mixed with the particulate binder composition or furnish can be at least partially cured to form the composite product.

Contacting and/or mixing the plurality of substrates to at least partially coat and/or mix the substrates with the particulate binder composition can include a continuous or semi-continuous blending process in which a mixture of the substrates and the particulate binder composition can be introduced to a blender at a first or introduction region, end, area, or other location(s) configured to receive the substrates and the particulate binder composition. The mixture can be withdrawn from the blender via one or more recovery outlets. The blender can be configured to contain anywhere from a few hundred kilograms to several thousand kilograms. For example, in a single blender, anywhere from a low of about 500 kg/hr, about 5,000 kg/hr, about 10,000 kg/hr, or about 13,000 kg/hr to a high of about 16,000 kg/hr, about 20,000 kg/hr, about 25,000 kg/hr, or about 30,000 kg/hr of the mixture can be recovered from the blender. In another example, in the single blender, anywhere from a low of about 10 kg/hr, about 20 kg/hr, about 30 kg/hr, or about 40 kg/hr to a high of about 140 kg/hr, about 160 kg/hr, about 180 kg/hr, or about 200 kg/hr of the mixture can be recovered from the blender. As the mixture exits the blender, the mixture can be deposited onto a conveyor belt and can be transported to one or more dryers, moistening systems, presses, and/or other processing equipment. For example, in at least one specific embodiment, a particleboard product can be made blending a first or "face" mixture and a second or "core" mixture in a first and second blend, respectively. The first blender can produce from about 13,600 kg/hr to about 15,900 kg/hr of a "face" mixture and the second blender can produce from about 18,100 kg/hr to about 20,400 kg/hr of a "core" mixture. The "face" and "core" mixtures can be used to produce a particleboard panel or sheet, where the "face" mixture makes up the outer layers of the particleboard and the "core" mixture makes up the inner or core layer of the particleboard.

Composite products in the shape or form of a panel, sheet, board, or the like can be in the form of a rectangular prism that includes six outer surfaces, e.g., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

At least partially curing the particulate binder composition can include applying heat and/or pressure thereto. The particulate binder composition can also be at least partially cured at room temperature (e.g., 25° C.) and pressure. The substrates contacted with the particulate binder composition can be formed into a desired shape, e.g., a board, a non-woven mat, a woven mat, or the like. The substrates contacted with the binder composition can be formed into a desired shape before, during, and/or after at least partial curing of the binder composition. Depending on the particular product, the substrates contacted with the particulate binder composition can be pressed before, during, and/or after the binder composition is at least partially cured. For example, the substrates contacted with the particulate binder composition can be consolidated or otherwise formed into a desired shape, if desired pressed to a particular density and thickness, and heated to at least partially cure the binder composition. In another example, a blended furnish, e.g., a mixture of the particulates and the particulate binder composition, can be extruded through a die (extrusion process) and heated to at least partially cure the particulate binder composition.

During production of the lignocellulose composite products, the pressure applied to the furnish can depend, at least in part, on the particular lignocellulose composite products. For example, the amount of pressure applied in a particleboard production process can range from about 0.02 MPa to about 8.5 MPa, about 0.04 MPa to about 8 MPa, about 0.06 MPa to about 7.5 MPa, about 0.08 MPa to about 7 MPa, about 0.1 MPa to about 6.5 MPa, about 0.5 MPa to about 6 MPa, about 1 MPa to about 5.5 MPa, about 1.5 MPa to about 5 MPa, about 2 MPa to about 4.5 MPa, about 2.5 MPa to about 4 MPa, or from about 3.0 MPa to about 3.5 MPa. In another example, the amount of pressure applied in a MDF production process can range from about 2 MPa to about 7 MPa or from about 3 MPa to about 6 MPa. The temperature the product can be heated to produce an at least partially cured product can range from a low of about 100° C., about 125° C., about 150° C., or about 170° C. to a high of about 180° C., about 200° C., about 220° C., or about 250° C. The length of time the pressure can be applied can range from a low of about 15 second, about 30 seconds, about 1 minute, about 3 minutes, about 5 minutes, or about 7 minutes to a high of about 10 minutes, about 15 minutes, about 20 minutes, or about 30 minutes. For example, the length of time the pressure and/or heat can be applied to the furnish can range from about 30 seconds to about 2 minutes, about 1 minute to about 3 minutes, about 1.5 minutes to about 4 minutes, or about 45 seconds to about 3.5 minutes. The length of time the pressure can be applied can depend, at least in part, on the particular product and/or the particular dimensions, e.g., thickness of the product.

If the lignocellulose composite products is in the form of a panel, sheet, board, or the like, the amount or length of time the mixture of the lignocellulose substrate and the particulate binder composition can be heated can range from a low of about 5 seconds per millimeter (s/mm), about 10 s/mm, about 12 s/mm, or about 15 s/mm to a high of about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm, where the length refers to the average thickness of the lignocellulose composite products. For example, the mixture can be heated for a time of about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm, where the length refers to the average thickness of the composite product. In another example, the mixture can be heated for a time less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm, where the length refers to the average thickness of the composite product.

Composite lignocellulose products such as particleboard, fiberboard, plywood, and oriented strand board, can have a thickness from a low of about 1.5 mm, about 2 mm, about 3 mm, about 4 mm, about 5 mm, or about 10 mm to a high of about 30 mm, about 35 mm, about 40 mm, about 45 mm, about 50 mm, about 55 mm, about 60 mm, about 70 mm, about 80 mm, about 90 mm, or about 100 mm. Lignocellulose based or lignocellulose composite products can be formed into sheets or boards. The sheets or boards can have a length of about 1 m, about 1.2 m, about 1.5 m, about 1.8 m, about 2.1 m, about 2.4 m, about 3 m, or about 3.6 m. The sheets or boards can have a width of about 0.6 m, about 1.2 m, about 1.8 m, about 2.4 m, or about 3 m.

The lignocellulose composite products can have a density from a low of about 0.5 g/cm$^3$, about 0.55 g/cm$^3$, about 0.6 g/cm$^3$, about 0.63 g/cm$^3$, about 0.65 g/cm$^3$, about 0.67 g/cm$^3$, or about 0.7 g/cm$^3$ to a high of about 0.75 g/cm$^3$, about 0.77 g/cm$^3$, about 0.8 g/cm$^3$, about 0.83 g/cm$^3$, about 0.85 g/cm$^3$, about 0.88 g/cm$^3$, about 0.93 g/cm$^3$, about 0.97 g/cm$^3$, about 1 g/cm$^3$, about 1.05 g/cm$^3$, or about 1.1 g/cm$^3$. For example, the composite product can have a density of about 0.7 g/cm$^3$ to about 0.75 g/cm$^3$, about 0.65 g/cm$^3$ to about 0.85 g/cm$^3$, about 0.65 g/cm$^3$ to about 0.8 g/cm$^3$, about 0.67 g/cm$^3$ to about 0.77 g/cm$^3$, about 0.5 g/cm$^3$, to about 1 g/cm$^3$, about 0.5 g/cm$^3$, to about 0.8 g/cm$^3$, about 0.5 g/cm$^3$ to about 0.75 g/cm$^3$, or about 0.64 g/cm$^3$ to about 0.8 g/cm$^3$. For example, the lignocellulose composite products can have density less than 1.1 g/cm$^3$, less than 1.05 g/cm$^3$, less than 1 g/cm$^3$, less than 0.95 g/cm$^3$, less than 0.88 g/cm$^3$, less than 0.85 g/cm$^3$, less than 0.83 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$.

The particulate binder composition can be used to produce a lignocellulose composite product or "composite product" that meets particular physical requirements while requiring less amine-aldehyde resins as compared to a comparative lignocellulose composite product using a liquid amine-aldehyde resin counterpart (e.g., before spray-drying), based on the total weight of the amine-aldehyde resin solids. For example, the composite product produced with the particulate binder composition including the amine-aldehyde resin having an increased flow and/or fusion diameter can include about 0.5%, about 0.75%, about 1%, about 1.25%, about 1.5%, about 3%, about 5%, about 7%, about 8%, about 10%, about 12%, about 14%, about 16%, about 18%, about 20%, about 22%, about 24%, or about 26% less amine-aldehyde resin as compared to the amount of the amine-aldehyde resin present in the comparative composite product using the liquid amine-aldehyde resin counterpart (e.g., before spray-drying), based on the total weight of the amine-aldehyde resin solids. In another example, the presence of the particulate binder composition including the amine-aldehyde resin can be used to produce a composite product that contains about 0.5% to about 25%, about 1% to about 20%, about 5% to about 18%, or about 7% to about 15% less amine-aldehyde resin as compared to the amount of the amine-aldehyde resin present in the comparative composite product using the resin in a liquid form, based on the total weight of the amine-aldehyde resin solids. In another example, the amount of the amine-aldehyde resin in the composite product produced with the particulate binder composition that includes the amine-aldehyde resin can be reduced by an amount from a low of about 0.5%, about 0.75%, about 1%, about 1.25%, about 1.5%, about 3%, about 6%, or about 8% to a high of about 14%, about 16%, about 18%, about 20%, about 22%, about 24%, or about 26% relative to the amount of the amine-aldehyde resin present in the comparative composite product using the resin in a liquid form, based on the total weight of the amine-aldehyde resin solids.

One or more properties of the composite product that can remain about the same and/or improve when produced with the particulate binder composition that includes the amine-aldehyde resin having an increased fusion diameter, as compared to the comparative composite product, can include, but is not limited to, internal bond strength (IB), bond durability, e.g., boiled internal bond (BIB), water absorption, thickness swell, and bending, e.g., modulus of rupture (MOR), modulus of elasticity (MOE), maximum moment (MM), and modulus of inertia (EI). For example, the internal bond strength of a composite product produced with the particulate binder composition that includes the amine-aldehyde resin can be equal to or greater than the internal bond strength of the comparative product.

The lignocellulose composite products can have an internal bond (IB) strength from a low of about 0.1 MPa, about 0.3 MPa, about 0.32 MPa, about 0.34 MPa, about 0.35 MPa, about 0.37 MPa, about 0.4 MPa, about 0.42 MPa, about 0.48 MPa, about 0.52 MPa, about 0.55 MPa, or about 0.58 MPa to a high of about 0.69 MPa, about 0.75 MPa, about 0.83 MPa, about 0.9 MPa, about 0.97 MPa, about 1.05 MPa, about 1.15 MPa, about 1.2 MPa, about 1.25 MPa, about 1.3 MPa, about 1.35 MPa, about 1.4 MPa, about 1.45 MPa, about 1.5 MPa, about 1.55 MPa, about 1.6 MPa, or about 1.7 MPa. For example, the lignocellulose composite products can have an internal bond strength of about 0.35 MPa to about 0.55 MPa, about 0.4 MPa to about 0.6 MPa, about 0.48 MPa to about 0.69 MPa, about 0.59 MPa to about 0.86 MPa, about 0.55 MPa to about 0.9 MPa, or about 0.51 MPa to about 0.85 MPa. In another example, the lignocellulose composite products can have an internal bond strength of at least 0.33 MPa, at least 0.32 MPa, at least 0.34 MPa, at least 0.38 MPa, at least 0.41 MPa, at least 0.45 MPa, at least 0.48 MPa, at least 0.51 MPa, at least 0.55 MPa, at least 0.58 MPa, at least 0.62 MPa, at least 0.66 MPa, at least 0.69 MPa, at least 0.72 MPa, at least 0.76 MPa, or at least 0.79 MPa. The internal bond strength can be determined according to the test procedure provided for in ASTM D1037-06a.

In one or more embodiments, the lignocellulose composite products can have a density of less than 1 g/cm$^3$, less than 0.95 g/cm$^3$, less than 0.9 g/cm$^3$, less than 0.85 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$ and an internal bond strength of at least 0.3 MPa, at least 0.35 MPa, at least 0.4 MPa, at least 0.48 MPa, at least 0.51 MPa, at least 0.55 MPa, at least 0.58 MPa, at least 0.62 MPa, at least 0.65 MPa, or at least 0.69 MPa. In at least one specific example, the lignocellulose composite products can have a density of less than 0.8 g/cm$^3$ and internal bond strength of at least 0.48 MPa.

Referring to particleboard in particular, particleboard made according to one or more embodiments discussed and described herein can meet or exceed the requirements for H-1, H-2, H-3, M-0, M-1, M-S, M-2, M-3i, LD-1, and/or LD-2 grade particleboard as described in the American National Standards Institute (ANSI) for particleboard, i.e., ANSI A208.1-2009 Particleboard, approved Feb. 2, 2009. Particleboard made according to one or more embodiments discussed and described herein can meet or exceed the requirements for PBU, D-2, D-3, and/or M-3 as defined by the ANSI for particleboard, i.e., ANSI A208.1-2009 Particleboard, approved Feb. 2, 2009. For example, Tables A and B set out certain requirements for the different grades of particleboard. Referring to oriented strand board (OSB) in particular, OSB made according to one or more embodiments discussed and described herein can meet or exceed the U.S. Department of Commerce Voluntary Performance Standard PS 2. Referring to plywood in particular, plywood made according to one or more embodiments discussed and described herein can meet or exceed the U.S. Department of Commerce Voluntary Performance Standard PS 1 and/or PS-2.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

One comparative example (CEx. 1-1) and two inventive examples (Ex. 1-1 and Ex. 2-1) were prepared. Each example was similarly prepared, however, the final viscosity of each example was varied before terminating the reaction.

The amine-aldehyde resins in the examples were prepared according to the following procedure. About 4,615.5 grams of a 50% solution of formaldehyde and about 2,429.3 grams of a 100% solution of urea were added to a reaction vessel at room temperature (e.g., 25° C.) to provide a mixture having a formaldehyde to urea molar ratio of about 1.90:1. The pH of the mixture was adjusted to a value of about 6.2 to about 6.6 by adding a sufficient amount of 50% sodium hydroxide (NaOH) and 20% ammonium sulfate. The mixture was heated to a temperature of about 100° C., held at about 100° C. for about 20 minutes, and then cooled to about 95° C. to produce a first intermediate. The pH of the mixture was then reduced to about 5.4 by adding a sufficient amount of ammonium sulfate thereto. Condensation of the mixture was carried out until a target viscosity of about 200 cP was reached, or a Gardner-Holdt viscosity of about H and about I, when measured at a temperature of 25° C. The mixture was then cooled to about 80° C. and the pH of the mixture was adjusted to about 5.6. About 208.5 grams of a 100% solution of urea was added to provide a mixture having a formaldehyde to urea molar ratio of about 1.75:1. The mixture was further reacted at 80° C. until a target viscosity of about 400 cP, or a Gardner-Holdt viscosity of about P, when measured at a temperature of 25° C. was reached. Then the pH of the mixture was adjusted to about 6.2 by adding a sufficient amount of 50% NaOH thereto, to produce an intermediate amine-aldehyde reaction product or the intermediate urea-formaldehyde reaction product. About 246.8 grams of urea was then added to the mixture to provide a mixture having a formaldehyde to urea molar ratio of about 1.60:1. In each of the examples (CEx. 1-1, Ex. 1-1, and Ex. 2-1), the mixture was then further reacted at 80° C. until a predetermined target viscosity was reached. The predetermined target viscosity for each of the examples (CEx. 1-1, Ex. 1-1, and Ex. 2-1) was varied from 500 cP to 1500 cP as further described below. When the predetermined target viscosity of the mixture was reached, the mixture was cooled to room temperature (e.g., 25° C.) and the pH was increased to about 7.6 by adding a sufficient amount of 50% NaOH thereto, to provide the urea-formaldehyde resin having a formaldehyde to urea molar ratio of about 1.60:1.

Comparative example (CEx. 1-1) was prepared according to the procedure discussed above. The mixture having a formaldehyde to urea molar ratio of about 1.60:1 was then further reacted at 80° C. until a target viscosity of about 1,500 cP, or a Gardner-Holdt viscosity of at least X, when measured at a temperature of 25° C., was reached, at which time the mixture was cooled to room temperature (e.g., 25° C.) and the pH was increased to about 7.6 by adding a sufficient amount of 50% NaOH thereto, to provide a urea-formaldehyde resin having a formaldehyde to urea molar ratio of about 1.60:1.

Example 1 (Ex. 1-1) was prepared according to the procedure discussed above. The mixture having a formaldehyde to urea molar ratio of about 1.60:1 was then further reacted at 80° C. until a target viscosity of about 900 cP, or a Gardner-Holdt viscosity of at least about V, when measured at a temperature of 25° C., was reached, at which time the mixture was cooled to room temperature (e.g., 25° C.) and the pH was increased to about 7.6 by adding a sufficient amount of 50% NaOH thereto to provide a urea-formaldehyde resin having a formaldehyde to urea molar ratio of about 1.60:1.

Example 2 (Ex. 2-1) was prepared according to the procedure discussed above. The mixture having a formaldehyde to urea molar ratio of about 1.60:1 was then further reacted at 80° C. until a target viscosity of about 500 cP, or a Gardner-Holdt viscosity of at least about S, when measured at a temperature of 25° C., was reached, at which time the mixture was cooled to room temperature (e.g., 25° C.) and the pH was increased to about 7.6 by adding a sufficient amount of 50% NaOH thereto to provide a urea-formaldehyde resin having a formaldehyde to urea molar ratio of about 1.60:1.

The urea-formaldehyde resins CEx. 1-1, Ex. 1-1, and Ex. 2-1 were spray-dried to provide particulate binder compositions CEx. 1-2, Ex. 1-2, Ex. 2-2, respectively. About 4,000 grams of the urea-formaldehyde resin of each urea-formaldehyde resin (CEx. 1-1, Ex. 1-1, and Ex. 2-1) having a solids concentration of about 35% was agitated using a high shear mixer that formed a vortex when mixing, thus allowing air to be whipped or blended into the mixture to produce an aerated mixture. The aerated mixture was continuously mixed at room temperature (e.g., 25° C.) during the spray-drying process. The aerated mixture was added to the spray-drying apparatus from the high shear mixer. The spray drying apparatus was a MOBILE MINOR® spray dryer from Niro, Inc. The inlet temperature of the dryer was set at about 150° C. and the feed rate of the aerated mixtures were adjusted to yield an outlet temperature of about 79° C. to about 85° C. The atomizer speed was set at 5 on the spray dryer's scale of 0 to 10.

The packed bulk density (PBD) (g/cm$^3$), moisture content (MC) (wt % based on total weight of the particulate binder composition), stroke cure time (SC) (seconds), and fusion diameter (FD) (mm) of the particulate binder composition for the spray-dried examples (CEx. 1-2, Ex. 1-2, Ex. 2-2) are shown in Table 1 below. The packed bulk density of the particulate binder composition was determined according to the Structural Board Association (SBA) GPAM2771.4 test procedure. The moisture content of the particulate binder composition was determined according to the SBA GPAM2771.5 test procedure. The stroke time of the particulate binder composition was determined according to the SBA GPAM2771.1 test procedure. The fusion diameter of the particulate binder composition was determined according to the SBA GPAM2771.2 test procedure.

The properties of the spray-dried particulate binder composition, CEx. 1-2, Ex. 1-2, Ex. 2-2, are shown below in Table 1.

TABLE 1

| Example | PBD (g/cm$^3$) | MC wt % | SC (sec.) | FD (mm) |
|---|---|---|---|---|
| CEx. 1-2 | 0.54 | 3.5 | 27 | 32 |
| Ex. 1-2 | 0.54 | 3.5 | 38 | 45 |
| Ex. 2-2 | 0.54 | 3.5 | 42 | 60 |

Three sets of examples (Examples 3, 4, and 5) having three panels per set were made with the spray-dried particulate binder composition from Example 1-2 (Ex. 1-2) discussed above. Each panel was a single layer, non-oriented, panel. The lignocellulose substrates used to produce all panels was Southern Yellow Pine having an average flake size of about 3 inches and having a moisture concentration of about 6.86 wt %. The difference between the Examples 3-5 was the amount of the particulate binder composition used to produce the composite product. Example 3 used a 3% loading, Example 4 used a 4% loading, and Example 5 used a 5% loading, based on the total weight of the dry lignocellulose substrates. A low mole ratio scavenger, LEAF®, in an amount of about 3 wt %, based on the total weight of the urea-formaldehyde resin particulate binder composition, was also added at a 3% loading for each panel. The press used to form the panels was a Wabash Metals Hydraulic Press having press platen of 24 inches×24 inches. The press heated the panels to a temperature of about 165.5° C.+/−5.5° C. when the panels were pressed.

Each panel was pressed for a time of about 240 seconds (series of examples labeled with an "A"), 270 seconds (series of examples labeled with a "B"), or 300 seconds (series of examples labeled with a "C"). Three panels were made per set, with each set corresponding to different loading of the particulate binder composition (e.g., 3%, 4%, and 5%). The formed panels were about 0.625 inches thick×16 inches×16 inches and had a target density of 48 pounds per cubic food (pcf). The internal bond (IB) strengths for each example (Examples 3, 4, and 5) were tested, with the value for each example shown in Table 2 below. Standard statistical methods were used to derive the data shown in Table 2.

TABLE 2

| | | Means Comparison | | | |
|---|---|---|---|---|---|
| | Press | IB, psi | | IB, psi | |
| Example | Time, sec | Mean | Std. Err. | −95% | +95% |
| Ex. 3A | 240 | 79.8 | 17.4 | 67.4 | 92.2 |
| Ex. 4A | 240 | 120.6 | 14.0 | 110.6 | 130.7 |
| Ex. 5A | 240 | 126.2 | 22.9 | 109.9 | 142.6 |
| Ex. 3B | 270 | 98.8 | 15.9 | 87.5 | 110.2 |
| Ex. 4B | 270 | 134.1 | 13.3 | 124.6 | 143.6 |
| Ex. 5B | 270 | 167.4 | 16.5 | 155.6 | 179.2 |
| Ex. 3C | 300 | 120.2 | 22.6 | 104.0 | 136.3 |
| Ex. 4C | 300 | 152.2 | 10.1 | 144.9 | 159.4 |
| Ex. 5C | 300 | 174.7 | 32.7 | 151.3 | 198.1 |

The results of the internal bond strength for the panels of Examples 3-5 were compared in more detail (Table 3-5) by using WinBUGS Statistical Analysis. Table 3 below, shows the Comparison of Means for the Internal bond at the 240 second press time. Example 4 and Example 5, containing 4% and 5% loading of the particulate binder composition, respectively, were compared to Example 3, containing a 3% loading of the particulate binder composition.

TABLE 3

| Example | Mean Diff | SD | Std. Err. | 2.50% | Median | 97.50% |
|---|---|---|---|---|---|---|
| Ex. 3A | — | — | — | — | — | — |
| Ex. 4A | 40.8 | 7.1 | 3.4 | 26.9 | 40.9 | 55.2 |
| Ex. 5A | 46.4 | 9.2 | 5.5 | 28.6 | 46.6 | 64.7 |

The WinBUGS Statistical Analysis in Table 3 indicated that Example 4 and Example 5 had significantly higher internal bond values compared to Example 3 at the minimum press time of 240 seconds.

Table 4 below, shows the Comparison of Means for the Internal Bond at the 270 second press time.

TABLE 4

| Example | Mean Diff | SD | Std. Err. | 2.50% | Median | 97.50% |
|---|---|---|---|---|---|---|
| Ex. 3B | — | — | — | — | — | — |
| Ex. 4B | 35.3 | 6.6 | 2.6 | 22.3 | 35.3 | 48.6 |
| Ex. 5B | 68.6 | 7.3 | 0.6 | 54.0 | 68.7 | 83.1 |

The WinBUGS Statistical Analysis in Table 4 indicated that Example 4 and Example 5 had significantly higher internal bond values when compared to Example 3 at the minimum press time of 270 seconds.

Table 5 below, shows the Comparison of Means for the Internal Bond at the 300 second press time.

TABLE 5

| Example | Mean Diff | SD | Std. Err. | 2.50% | Median | 97.50% |
|---|---|---|---|---|---|---|
| Ex. 3C | — | — | — | — | — | — |
| Ex. 4C | 32.1 | 7.8 | 12.5 | 16.5 | 32.0 | 47.6 |
| Ex. 5C | 54.7 | 12.6 | 10.1 | 29.9 | 54.7 | 79.7 |

The WinBUGS Statistical Analysis in Table 5 indicated that Example 4 and Example 5 had significantly higher internal bond values when compared to Example 3 at the minimum press time of 300 seconds.

As shown in Tables 2, 3, 4, and/or 5, the spray-dried resins of Example 4 and Example 5 both provided significantly higher internal bond values compared to Example 3 at all three press times. Further, as shown in Tables 2, 3, 4, and/or 5, the spray-dried resin of Example 5 had significantly higher internal bond values compared to Example 4 at a press time of 270 seconds and 300 seconds.

Embodiments of the present disclosure further relate to any one or more of the following paragraphs:

1. A method for making a particulate binder composition, comprising: spray-drying an amine-aldehyde resin having a total aldehyde compound to total amine compound molar ratio of about 1.55:1 to about 1.65:1 to produce a particulate binder composition, wherein the particulate binder composition has a fusion diameter of about 35 mm to about 70 mm.

2. The method according to paragraph 1, further comprising mixing an intermediate amine-aldehyde reaction product having a total aldehyde compound to total amine compound molar ratio of about 1.7:1 to about 1.8:1 with a first amine compound to produce the amine-aldehyde resin.

3. The method according to paragraph 2, wherein the intermediate amine-aldehyde reaction product and the first amine compound are reacted to produce the amine aldehyde resin, and wherein the amine-aldehyde resin has a viscosity of about W on the Gardner-Holdt scale at a temperature of 25° C.

4. The method according to paragraph 2, wherein the intermediate amine-aldehyde reaction product and the first amine compound are reacted to produce the amine-aldehyde resin, and wherein the amine-aldehyde resin has a viscosity of about 900 cP to about 1,200 cP at a temperature of 25° C.

5. The method according to paragraph 2, wherein the intermediate amine-aldehyde reaction product comprises a urea-formaldehyde resin and the first amine compound comprises urea, and wherein the intermediate amine-aldehyde reaction product is mixed with the first amine compound at a temperature of about 80° C. or less and at a pH of about 6.2 or greater.

6. The method according to paragraph 2, further comprising: reacting an aldehyde compound and a second amine compound at a molar ratio of about 1.85:1 to about 1.95:1 to produce a first intermediate; and mixing the first intermediate with a third amine compound to produce the intermediate amine-aldehyde reaction product.

7. The method according to paragraph 6, wherein the first intermediate is reacted with the third amine compound to produce the intermediate amine-aldehyde reaction product, wherein the intermediate amine-aldehyde reaction product has a viscosity of about P on the Gardner-Holdt scale at a temperature of 25° C.

8. The method according to paragraph 6, wherein the first intermediate is reacted with the third amine compound to produce the intermediate amine-aldehyde reaction product, and wherein the intermediate amine-aldehyde reaction product has a viscosity of about 300 cP to about 500 cP at a temperature of 25° C.

9. The method according to paragraph 6, wherein the aldehyde compound and the second amine compound are reacted at a temperature of about 95° C. or less and at a pH of about 5.3 to about 5.5 to produce the first intermediate, wherein the first intermediate has a viscosity of about P on the Gardner-Holdt scale at a temperature of 25° C., and wherein the first intermediate is further reacted at a temperature of about 80° C. or less and at a pH of about 5.4 to about 5.7.

10. The method according to paragraph 6, wherein the aldehyde compound and the second amine compound are reacted at a temperature of about 95° C. or less and at a pH of about 5.3 to about 5.5 to produce the first intermediate, wherein the first intermediate has a viscosity of about 160 cP to about 250 cP at a temperature of 25° C., and wherein the first intermediate is further reacted at a temperature of about 80° C. or less and at a pH of about 5.4 to about 5.7.

11. The method according to any one of paragraphs 1 to 10, wherein the particulate binder composition has a stroke cure time of about 30 seconds to about 45 seconds.

12. The method according to any one of paragraphs 1 to 11, wherein the amine-aldehyde resin has a total solids content from about 50 wt % to about 70 wt %.

13. The method according to any one of paragraphs 1 to 12, wherein the particulate binder composition has a packed bulk density from about 0.3 g/cm$^3$ to about 0.8 g/cm$^3$.

14. The method according to any one of paragraphs 1 to 13, further comprising: combining the particulate binder composition with a plurality of lignocellulose substrates to form a curable mixture; and at least partially curing the curable mixture to produce a composite product.

15. The method according to paragraph 14, wherein the amine-aldehyde resin comprises a urea-formaldehyde resin.

16. A method for making a particulate binder composition, comprising: reacting an intermediate amine-aldehyde reaction product having a total aldehyde compound to total amine compound molar ratio of about 1.7:1 to about 1.8:1 with a first amine compound to produce a liquid amine-aldehyde resin having a total aldehyde compound to total amine compound molar ratio of about 1.55:1 to about 1.65:1; agitating the liquid amine-aldehyde resin to produce an aerated mixture; and spray-drying the aerated mixture to produce the particulate binder composition, wherein the particulate binder composition has a fusion diameter of about 35 mm to about 70 mm.

17. The method according to paragraph 16, wherein the intermediate amine-aldehyde reaction product comprises a urea-formaldehyde resin and the first amine compound comprises urea, and wherein the intermediate amine-aldehyde reaction product is mixed with the first amine compound at a temperature of about 80° C. or less and at a pH of about 6.2 or greater.

18. The method according to paragraph 16, further comprising: reacting an aldehyde compound and a second amine compound at a molar ratio of about 1.85:1 to about 1.95:1 to produce a first intermediate; and reacting the first intermediate to produce the intermediate amine-aldehyde reaction product.

19. The method according to paragraph 16, wherein the intermediate amine-aldehyde reaction product and the first amine compound are reacted to produce the liquid amine-aldehyde resin having a viscosity of about 900 cP to about 1,200 cP at a temperature of 25° C.

20. The method according to paragraph 16, wherein the first intermediate is reacted to produce the intermediate amine-aldehyde reaction product having a viscosity of about 300 cP to about 500 cP at a temperature of 25° C.

21. A method for making a particulate binder composition, comprising: reacting an intermediate amine-aldehyde reaction product having a total aldehyde compound to total amine compound molar ratio of about 1.7:1 to about 1.8:1 with a first amine compound to produce a liquid amine-aldehyde resin having a total aldehyde compound to total amine compound molar ratio of about 1.55:1 to about 1.65:1; agitating the liquid amine-aldehyde resin to produce an aerated mixture; spray-drying the aerated mixture to produce the particulate binder composition, wherein the particulate binder composition has a fusion diameter of about 35 mm to about 70 mm; combining the particulate binder composition with a plurality of lignocellulose substrates to form a curable mixture; and at least partially curing the curable mixture to produce a composite product.

22. A method for making a composite product, comprising: reacting an intermediate amine-aldehyde reaction product having a total aldehyde compound to total amine compound molar ratio of about 1.7:1 to about 1.8:1 with a first amine compound to produce a liquid amine-aldehyde resin having a total aldehyde compound to total amine compound molar ratio of about 1.55:1 to about 1.65:1; agitating the liquid amine-aldehyde resin to produce an aerated mixture; spray-drying the aerated mixture to produce the particulate binder composition, wherein the particulate binder composition has a fusion diameter of about 35 mm to about 70 mm; combining the particulate binder composition with a plurality of lignocellulose substrates to form a curable mixture; and at least partially curing the curable mixture to produce a composite product.

23. The method according to paragraph 21 or 22, wherein the composite product has an internal bond strength of about 0.1 MPa to about 2 MPa.

24. The method according to paragraph 21 or 22, wherein the curable mixture comprises about 1 wt % to about 20 wt % of the particulate binder, based on a dry weight of the plurality of lignocellulose substrates, and wherein the composite product has an internal bond strength of about 0.35 MPa to about 2 MPa.

25. The method according to paragraph 21 or 22, wherein the curable mixture comprises about 1 wt % to about 10 wt % of the particulate binder, based on a dry weight of the plurality of lignocellulose substrates, and wherein the composite product has an internal bond strength of about 0.4 MPa to about 2 MPa.

26. The method according to paragraph 21 or 22, wherein the curable mixture comprises about 2 wt % to about 8 wt % of the particulate binder, based on a dry weight of the plurality of lignocellulose substrates, and wherein the composite product has an internal bond strength of about 0.5 MPa to about 2 MPa.

27. The method according to paragraph 21 or 22, wherein the curable mixture comprises about 3 wt % to about 7 wt % of the particulate binder, based on a dry weight of the plurality of lignocellulose substrates, and wherein the composite product has an internal bond strength of about 0.6 MPa to about 2 MPa.

28. The method according to any one of paragraphs 21 to 27, wherein the intermediate amine-aldehyde reaction product and the first amine compound are reacted produce the liquid amine-aldehyde resin having a predetermined viscosity of about W on the Gardner-Holdt scale at a temperature of 25° C.

29. The method according to any one of paragraphs 21 to 28, wherein the liquid amine-aldehyde resin has a viscosity of about 900 cP to about 1,200 cP at a temperature of 25° C.

30. A particulate binder composition, comprising: an amine-aldehyde resin having a total aldehyde compound to total amine compound molar ratio of about 1.55:1 to about 1.65:1 and a fusion diameter of 35 mm to about 70 mm.

31. The particulate binder composition of paragraph 30, wherein the particulate binder composition has a stroke cure time of about 30 seconds to about 45 seconds.

32. The particulate binder composition according to paragraph 30 or 31, wherein the particulate binder composition has a stroke cure time of about 35 seconds to about 45 seconds 33. The method or particulate binder composition according to any one of paragraphs 1 to 31, wherein the particulate binder composition has an average particle size of about 0.1 µm to about 150 µm.

34. The method or particulate binder composition according to any one of paragraphs 1 to 33, wherein about 80 wt % to about 90 wt % of the particulate binder composition has an average particle size of less than 100 µm.

35. The method or particulate binder composition according to any one of paragraphs 1 to 33, wherein about 60 wt % to about 70 wt % of the particulate binder composition has an average particle size of less than 60 µm.

36. The method or particulate binder composition according to any one of paragraphs 1 to 35, wherein the particulate binder composition has a packed bulk density from about 0.1 g/cm$^3$ to about 0.6 g/cm$^3$.

37. The method or particulate binder composition according to any one of paragraphs 1 to 35, wherein the particulate binder composition has a packed bulk density from about 0.3 g/cm$^3$ to about 0.4 g/cm$^3$.

38. The method or particulate binder composition according to any one of paragraphs 1 to 35, wherein the particulate binder composition has a packed bulk density from about 0.15 g/cm$^3$ to about 0.5 g/cm$^3$.

39. The method or particulate binder composition according to any one of paragraphs 1 to 38, wherein the particulate binder composition has a fusion diameter of about 40 mm to about 70 mm.

40. The method or particulate binder composition according to any one of paragraphs 1 to 38, wherein the particulate binder composition has a fusion diameter of about 45 mm to about 70 mm.

41. The method or particulate binder composition according to any one of paragraphs 1 to 38, wherein the particulate binder composition has a fusion diameter of about 50 mm to about 70 mm.

42. The method or particulate binder composition according to any one of paragraphs 1 to 38, wherein the particulate binder composition has a fusion diameter of at least 35 mm to about 70 mm.

43. The method or particulate binder composition according to any one of paragraphs 1 to 38, wherein the particulate binder composition has a fusion diameter of at least 40 mm to about 70 mm.

44. The method or particulate binder composition according to any one of paragraphs 1 to 38, wherein the particulate binder composition has a fusion diameter of at least 45 mm to about 70 mm.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making a particulate binder composition, comprising:
   spray-drying an amine-aldehyde resin having a total aldehyde compound to total amine compound molar ratio of about 1.55:1 to about 1.65:1 to produce a particulate binder composition, wherein the particulate binder composition has a fusion diameter of about 35 mm to about 70 mm.

2. The method of claim 1, further comprising mixing an intermediate amine-aldehyde reaction product having a total aldehyde compound to total amine compound molar ratio of about 1.7:1 to about 1.8:1 with a first amine compound to produce the amine-aldehyde resin.

3. The method of claim 2, wherein the intermediate amine-aldehyde reaction product and the first amine compound are reacted to produce the amine-aldehyde resin, and wherein the amine-aldehyde resin has a viscosity of about 900 cP to about 1,200 cP at a temperature of 25° C.

4. The method of claim 2, wherein the intermediate amine-aldehyde reaction product comprises a urea-formaldehyde resin and the first amine compound comprises urea, and wherein the intermediate amine-aldehyde reaction product is mixed with the first amine compound at a temperature of about 80° C. or less and at a pH of about 6.2 or greater.

5. The method of claim 2, further comprising:
   reacting an aldehyde compound and a second amine compound at a molar ratio of about 1.85:1 to about 1.95:1 to produce a first intermediate; and
   mixing the first intermediate with a third amine compound to produce the intermediate amine-aldehyde reaction product.

6. The method of claim 5, wherein the first intermediate is reacted with the third amine compound to produce the intermediate amine-aldehyde reaction product, and wherein the intermediate amine-aldehyde reaction product has a viscosity of about 300 cP to about 500 cP at a temperature of 25° C.

7. The method of claim 5, wherein the aldehyde compound and the second amine compound are reacted at a temperature of about 95° C. or less and at a pH of about 5.3 to about 5.5 to produce the first intermediate, wherein the first intermediate has a viscosity of about 160 cP to about 250 cP at a temperature of 25° C., and wherein the first intermediate is further reacted at a temperature of about 80° C. or less and at a pH of about 5.4 to about 5.7.

8. The method of claim 1, wherein the particulate binder composition has a stroke cure time of about 30 seconds to about 45 seconds.

9. The method of claim 1, wherein the amine-aldehyde resin has a total solids content from about 50 wt % to about 70 wt %.

10. The method of claim 1, wherein:
   the amine-aldehyde resin comprises a urea-formaldehyde resin,
   the particulate binder composition has a fusion diameter of at least 40 mm to about 70 mm,
   the particulate binder composition has a stroke cure time of about 30 seconds to about 45 seconds,
   the particulate binder composition has an average particle size of about 0.1 μm to about 150 μm, and
   the particulate binder composition has a packed bulk density from about 0.3 g/cm$^3$ to about 0.8 g/cm$^3$.

11. The method of claim 1, further comprising:
   combining the particulate binder composition with a plurality of lignocellulose substrates to form a curable mixture; and
   at least partially curing the curable mixture to produce a composite product.

12. The method of claim 11, wherein the amine-aldehyde resin comprises a urea-formaldehyde resin.

13. A method for making a particulate binder composition, comprising:
   reacting an intermediate amine-aldehyde reaction product having a total aldehyde compound to total amine compound molar ratio of about 1.7:1 to about 1.8:1 with a first amine compound to produce a liquid amine-aldehyde resin having a total aldehyde compound to total amine compound molar ratio of about 1.55:1 to about 1.65:1;
   agitating the liquid amine-aldehyde resin to produce an aerated mixture; and
   spray-drying the aerated mixture to produce the particulate binder composition, wherein the particulate binder composition has a fusion diameter of about 35 mm to about 70 mm.

14. The method of claim 13, wherein the intermediate amine-aldehyde reaction product comprises a urea-formaldehyde resin and the first amine compound comprises urea, and wherein the intermediate amine-aldehyde reaction product is mixed with the first amine compound at a temperature of about 80° C. or less and at a pH of about 6.2 or more.

15. The method of claim 13, further comprising:
   reacting an aldehyde compound and a second amine compound at a molar ratio of about 1.85:1 to about 1.95:1 to produce a first intermediate; and
   reacting the first intermediate to produce the intermediate amine-aldehyde reaction product.

16. The method of claim 13, wherein the intermediate amine-aldehyde reaction product and the first amine compound are reacted to produce the liquid amine-aldehyde resin having a viscosity of about 900 cP to about 1,200 cP at a temperature of 25° C.

17. A spray-dried particulate binder composition comprising an amine-aldehyde resin having a total aldehyde compound to total amine compound molar ratio of about 1.55:1 to about 1.65:1, wherein the spray-dried particulate binder composition has a fusion diameter of about 35 mm to about 70 mm.

18. The spray-dried particulate binder composition of claim 17, wherein the amine-aldehyde resin comprises a urea-formaldehyde resin.

19. The spray-dried particulate binder composition of claim 17, wherein the spray-dried particulate binder composition has a fusion diameter of at least 40 mm to about 70 mm and a stroke cure time of about 30 seconds to about 45 seconds.

20. The spray-dried particulate binder composition of claim 17, wherein:
   the amine-aldehyde resin comprises a urea-formaldehyde resin,
   the spray-dried particulate binder composition has a fusion diameter of at least 40 mm to about 70 mm, a stroke cure time of about 30 seconds to about 45 seconds, an average particle size of about 0.1 μm to about 150 μm, and a packed bulk density of about 0.3 g/cm$^3$ to about 0.8 g/cm$^3$.

* * * * *